(12) United States Patent
Sorenson, III

(10) Patent No.: US 9,621,468 B1
(45) Date of Patent: Apr. 11, 2017

(54) PACKET TRANSMISSION SCHEDULER

(71) Applicant: Amazon Technologies, Inc., Reno, NV (US)

(72) Inventor: James Christopher Sorenson, III, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 32 days.

(21) Appl. No.: 14/562,265

(22) Filed: Dec. 5, 2014

(51) Int. Cl.
  *H04L 12/26* (2006.01)
  *H04L 12/819* (2013.01)
  *H04L 12/841* (2013.01)
  *H04L 12/863* (2013.01)

(52) U.S. Cl.
  CPC .............. *H04L 47/21* (2013.01); *H04L 43/16* (2013.01); *H04L 47/28* (2013.01); *H04L 47/6255* (2013.01)

(58) Field of Classification Search
  USPC ......... 370/230, 230.1, 235, 235.1, 345, 360, 370/363, 395.4, 412, 428, 429
  See application file for complete search history.

(56) References Cited

U.S. PATENT DOCUMENTS

| | | | |
|---|---|---|---|
| 7,349,332 B1 * | 3/2008 | Srinivasan | H04L 12/5693 370/229 |
| 7,392,279 B1 * | 6/2008 | Chandran | H04L 12/5693 370/230.1 |
| 7,567,504 B2 | 7/2009 | Darling et al. | |
| 2003/0026287 A1 | 2/2003 | Mullendore et al. | |
| 2004/0003099 A1 | 1/2004 | House et al. | |
| 2004/0205250 A1 | 10/2004 | Bain et al. | |

(Continued)

FOREIGN PATENT DOCUMENTS

| | | |
|---|---|---|
| JP | 2003131961 | 5/2003 |
| JP | 2012044623 | 3/2012 |

OTHER PUBLICATIONS

Elif Uysal-Biyikoglu; et al., "Energy-Efficient Packet Transmission Over a Wireless Link", IEEE/ACM Transactions on Networking, vol. 10, No. 4, Aug. 2002, pp. 487-499.

(Continued)

*Primary Examiner* — Kwang B Yao
*Assistant Examiner* — Nguyen Ngo
(74) *Attorney, Agent, or Firm* — Robert C. Kowert; Meyertons, Hood, Kivlin, Kowert & Goetzel, P.C.

(57) ABSTRACT

A packet transmission scheduler that may temporally smooth packet transmission over paths or connections to destinations by scheduling packets for transmission to destinations during transmit windows, and by limiting the amount of data that is scheduled for transmission to each destination in each transmit window. A transmit window limit and state information may be maintained for each destination and used in scheduling packets for the destination in the transmit windows. The scheduler may dynamically adjust the transmit window limits for the destinations according to performance feedback for the connections, allowing the packet transmission scheduler to determine optimal or near-optimal transmit window limits for connections so that packets can be sent to the destinations as quickly as possible at rates that the respective connections can handle without dropping packets or experiencing other problems such as long round trip times.

20 Claims, 14 Drawing Sheets

(56) References Cited

U.S. PATENT DOCUMENTS

| | | |
|---|---|---|
| 2004/0246895 A1 | 12/2004 | Feyerabend |
| 2005/0027862 A1 | 2/2005 | Nguyen et al. |
| 2005/0071469 A1 | 3/2005 | McCollom et al. |
| 2007/0076621 A1* | 4/2007 | Malhotra ............... H04L 47/10 370/252 |
| 2007/0153682 A1* | 7/2007 | Swenson ............... H04L 47/10 370/229 |
| 2008/0080548 A1 | 4/2008 | Mullendore et al. |
| 2009/0144444 A1 | 6/2009 | Chauffour et al. |
| 2009/0240705 A1 | 9/2009 | Miloushev et al. |
| 2010/0036903 A1 | 2/2010 | Ahmad et al. |
| 2011/0026521 A1* | 2/2011 | Gamage ............... H04L 43/028 370/389 |
| 2011/0161980 A1 | 6/2011 | English et al. |
| 2011/0283013 A1 | 11/2011 | Grosser et al. |
| 2012/0033550 A1* | 2/2012 | Yano ..................... H04L 47/10 370/230 |
| 2012/0069829 A1* | 3/2012 | Cote ..................... H04L 65/607 370/338 |
| 2012/0170575 A1 | 7/2012 | Mehra |
| 2012/0246637 A1 | 9/2012 | Kreeger et al. |
| 2013/0163422 A1* | 6/2013 | Isobe ................... H04L 47/225 370/230.1 |
| 2013/0258838 A1* | 10/2013 | Colven ................ H04L 49/552 370/218 |
| 2013/0322255 A1* | 12/2013 | Dillon .................. H04L 47/22 370/236 |
| 2015/0071074 A1* | 3/2015 | Zaidi .................... H04L 45/308 370/235.1 |
| 2015/0256466 A1* | 9/2015 | Roitshtein ........... H04L 47/2483 709/234 |

OTHER PUBLICATIONS

Sourabh Bharti, et al., "Dynamic Distributed Flow Scheduling with Load Balancing for Data Center Networks", Procedia Computer Science 19, 2013, pp. 124-130.

"Advanced Load Balancing: 8 Must-Have Features for Today's Network Demands" Citrix Systems, Inc. NetScaler white paper, Sep. 2009, pp. 1-9.

"Citrix Netscaler Load Balancing Algorithms" University of Wisconsin KnowledgeBase, Downloaded from kb.wisc.edu/ns/page.php?id=13201 on Apr. 14, 2013, pp. 1-5.

"Is your load balancer cloud ready? How NetScaler helps enterprises achieve cloud computing benefits" Citrix Systems, Inc. NetScaler white paper, Apr. 2010, pp. 1-9.

"Intel® Data Plane Development Kit (Intel® DPDK) Getting Started Guide", Nov. 2012, pp. 1-18.

"Intel® Data Plane Development Kit (Intel® DPDK) Programmer's Guide", Nov. 2012, pp. 1-90.

"Intel® Data Plane Development Kit (Intel® DPDK) Sample Application User's Guide" Nov. 2012, pp. 1-75.

U.S. Appl. No. 13/864,162, filed Apr. 16, 2013, James Christopher Sorenson III.

U.S. Appl. No. 13/864,157, filed Apr. 16, 2013, James Christopher Sorenson III.

U.S. Appl. No. 13/864,167, filed Apr. 16, 2013, James Christopher Sorenson III.

U.S. Appl. No. 13/864,152, filed Apr. 16, 2013, James Christopher Sorenson III.

* cited by examiner connection states 270

| destination | Bucket/Window | Usage |
|---|---|---|
| subnet 260A | 244C (*t+2*) | 60 |
| address 260B | 244A (*t*) | 40 |
| address 260C | 244D (*t+3*) | 35 |
| . | . | . |
| . | . | . |
| . | . | . |

FIG. 3A connection states 270

| destination | Bucket/Window | Usage |
|---|---|---|
| subnet 260A | 244C (*t+1*) | 80 |
| address 260B | 244D (*t+2*) | 40 |
| address 260C | 244E (*t+3*) | 25 |
| . | . | . |
| . | . | . |
| . | . | . |

FIG. 3B connection configurations 272

| destination | Transmit window limit |
|---|---|
| subnet 260A | 100 |
| address 260B | 80 |
| address 260C | 50 |
| . | . |
| . | . |
| . | . |

FIG. 3C

PACKET TRANSMISSION SCHEDULER

BACKGROUND

As the scale and scope of network-based applications and network-based services such as cloud computing and cloud-based storage services have increased, data centers may house hundreds or even thousands of host devices (e.g., web servers, application servers, data servers, etc.) on a network that may serve data to clients via one or more external networks such as the Internet. A data center network may generally include high capacity equipment (e.g., servers, switches, routers, load balancers, gateways, network interface controllers (NICs), cables, etc.) that is capable of bursting large amounts of data from the host devices onto the external network(s) to be routed to various destinations. However, the external network(s) may include network equipment that provides various packet queuing and bandwidth capabilities. For example, servers, load balancers, or other network equipment on the data center network may include NICs that are capable of 10 Gigabits per second (Gbps) or higher throughput for outgoing data (e.g., Transmission Control Protocol (TCP) packets on TCP connections to client endpoints), while an external network may include equipment such as routers and servers that include NICs that are only able to handle 1 Gbps throughput. The external network equipment may queue some received packets when bursts of data are received, but in some cases the network equipment may not have the queuing capacity to handle the bursts of data, and some packets may be dropped. Thus, a path or link through the network infrastructure across the external network(s) to a client endpoint may not have the bandwidth and packet queuing capability to handle large bursts of data, and may thus drop packets at one or more network devices, or may experience other problems such as long round trip times (RTTs).

BRIEF DESCRIPTION OF THE DRAWINGS

FIGS. 3A and 3B illustrate example connection states for packet transmission scheduling in an example network environment, according to at least some embodiments.

FIG. 3C illustrates example configuration information for connections to destinations, according to at least some embodiments.

Figure 1A:
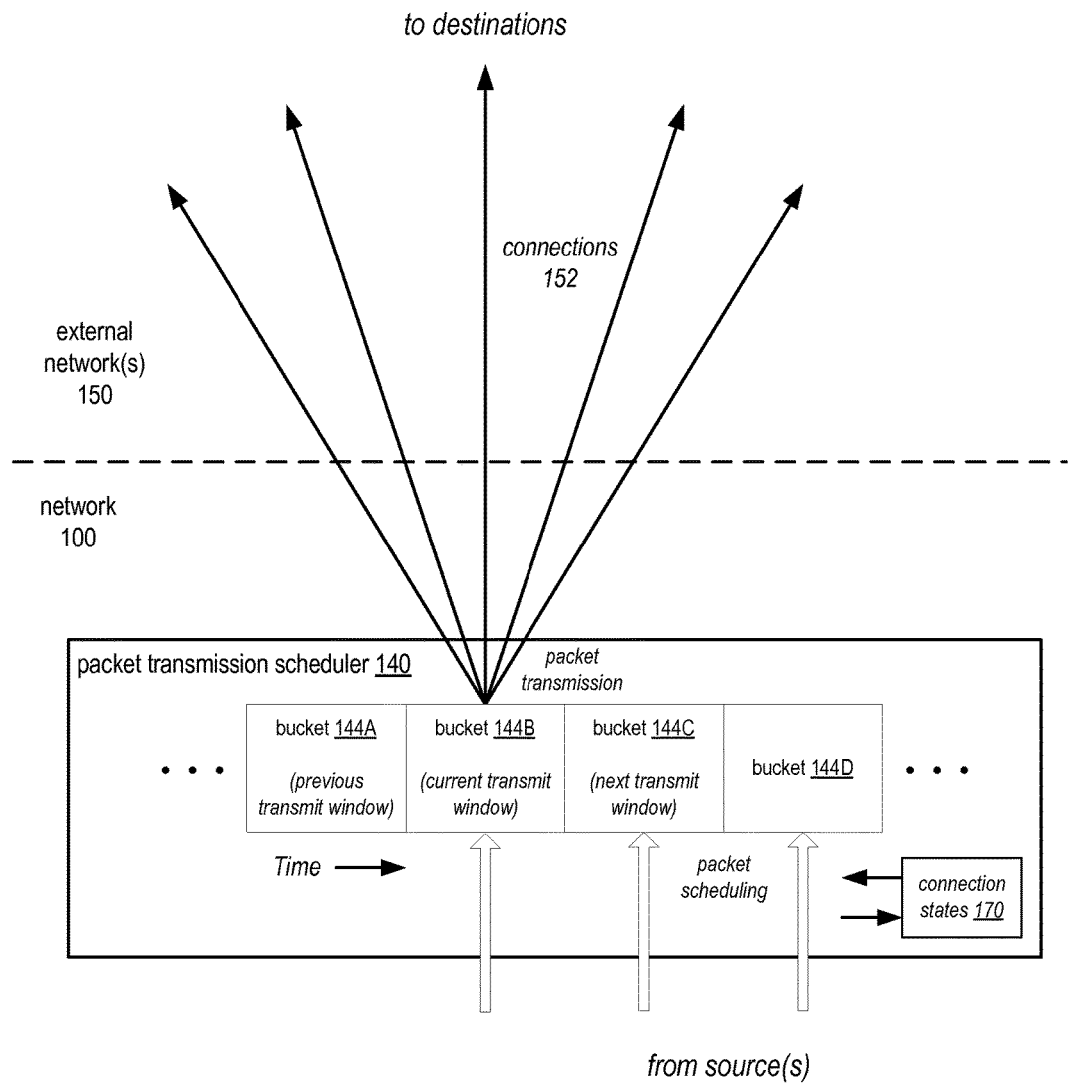
FIG. 1A illustrates a packet transmission scheduler, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of methods and apparatus for scheduling transmission of data packets to destinations are described. Embodiments of packet transmission scheduling methods and packet transmission scheduler devices, components, or modules that implement those methods are described that may be implemented in various networking devices and networking environments. A network may include high capacity equipment (e.g., servers, switches, routers, load balancers, gateways, network interface controllers (NICs), cables, etc.) capable of bursting large amounts of data onto an external network to be routed to various destinations. However, a path or link through the network infrastructure across the external network to a client endpoint may not have the bandwidth and packet queuing capability to handle large bursts of data, and may thus drop packets, or may experience other problems such as long round trip times (RTTs).

Embodiments of a packet transmission scheduler may be implemented on a network to temporally smooth packet transmission over paths or connections to packet destinations on an external network by scheduling the packets for transmission to the destinations during a plurality of time intervals and by limiting the amount of data that is scheduled for transmission to each destination in each time interval. The time intervals may be referred to as transmit windows. In some embodiments, configuration and state information may be maintained for each connection and used in scheduling packets for the connections in the transmit windows. In some embodiments, the configuration information for each connection may include a transmit window limit for the connection. In some embodiments, the packet transmission scheduler may dynamically adjust the transmit window limits for the connections according to performance feedback for the connections, allowing the packet transmission scheduler to determine optimal or near-optimal transmit window limits for connections so that packets can be sent to the destinations as quickly as possible at rates that the respective connections can handle without dropping packets or experiencing other problems such as long RTTs.

Figure 1B:
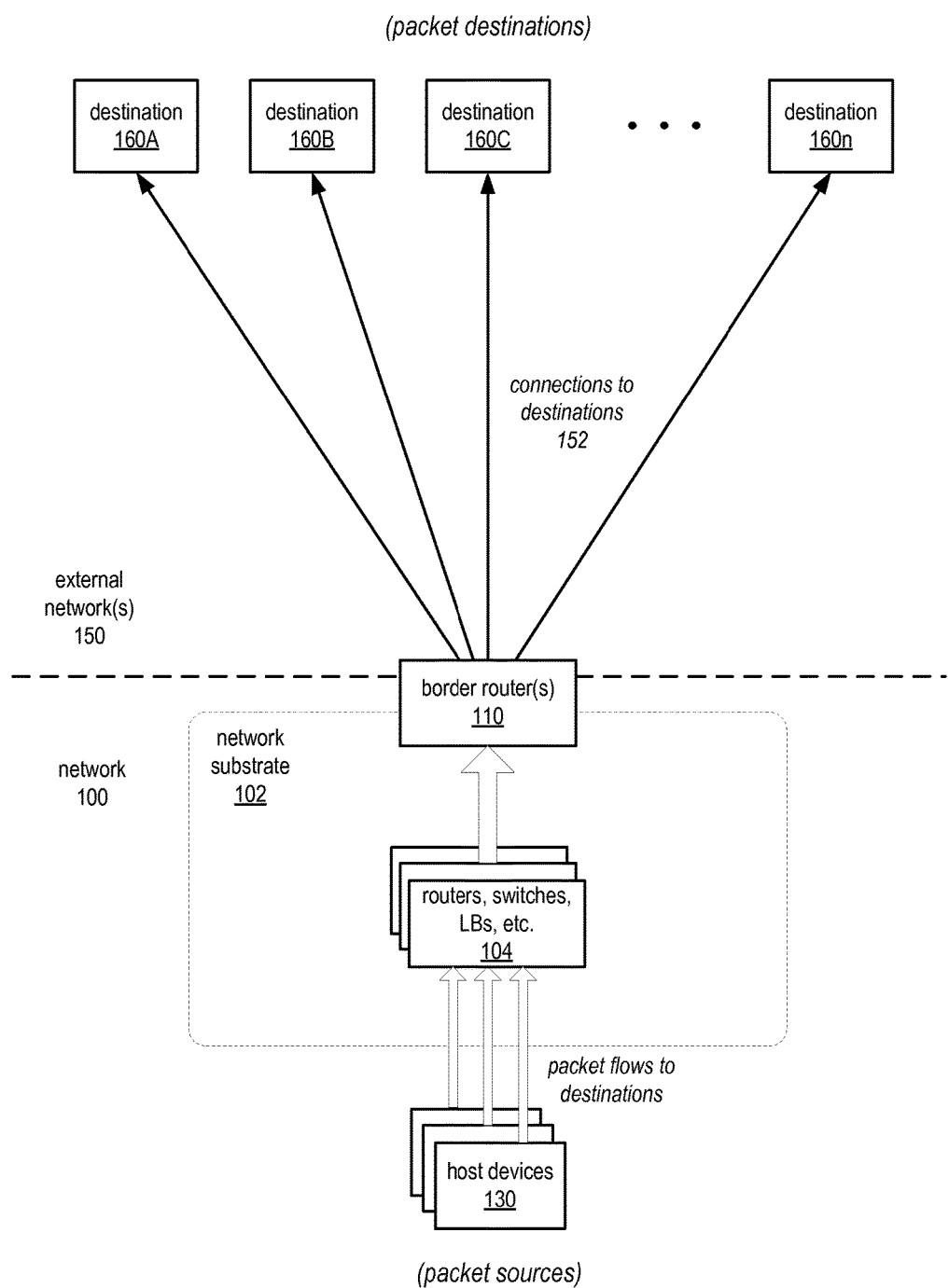
FIG. 1B illustrates an example network environment in which embodiments of a packet transmission scheduler as illustrated in FIG. 1A may be implemented.
Figure 2A:
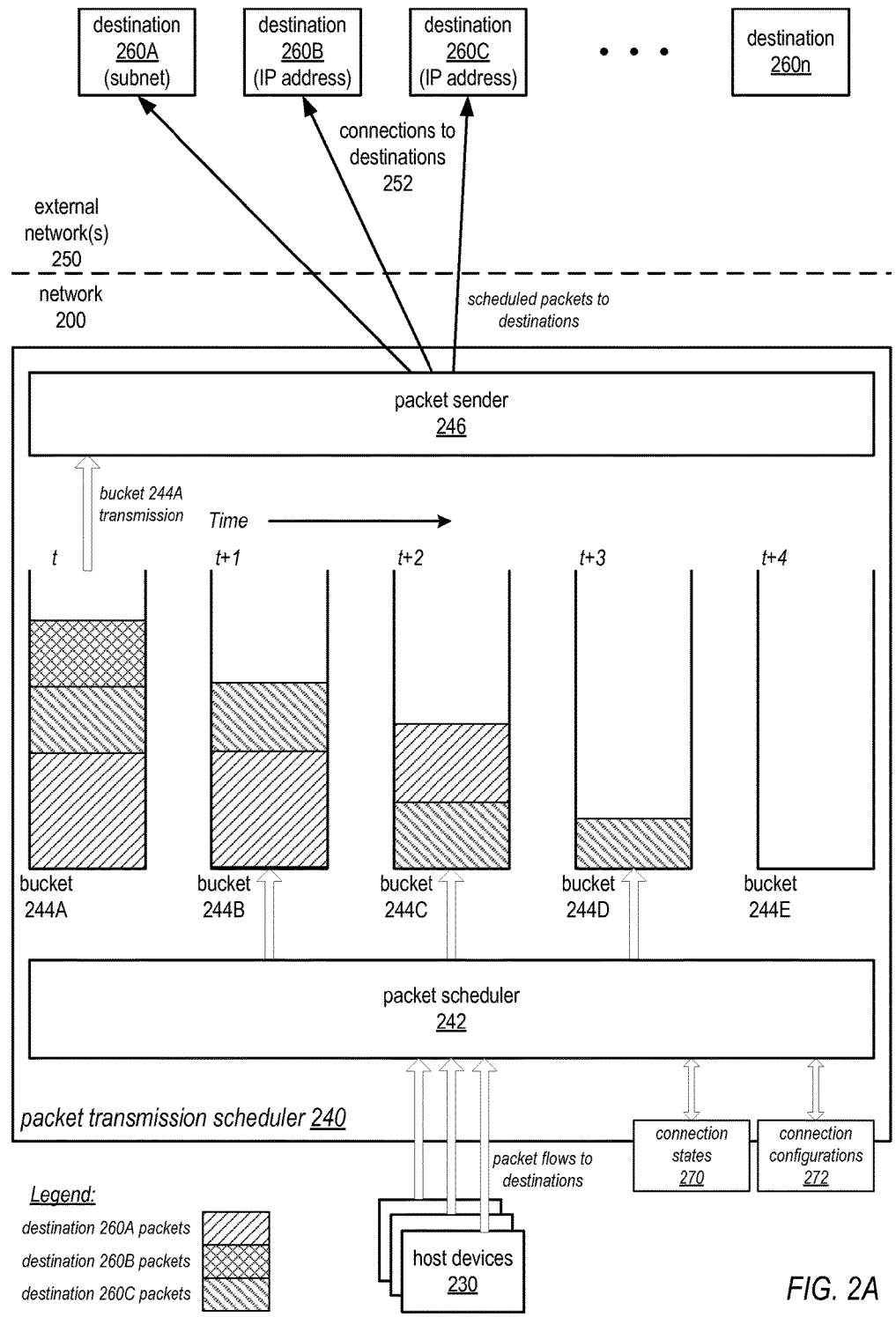
FIGS. 2A and 2B illustrate packet transmission scheduling in an example network environment, according to at least some embodiments.
Figure 2B:
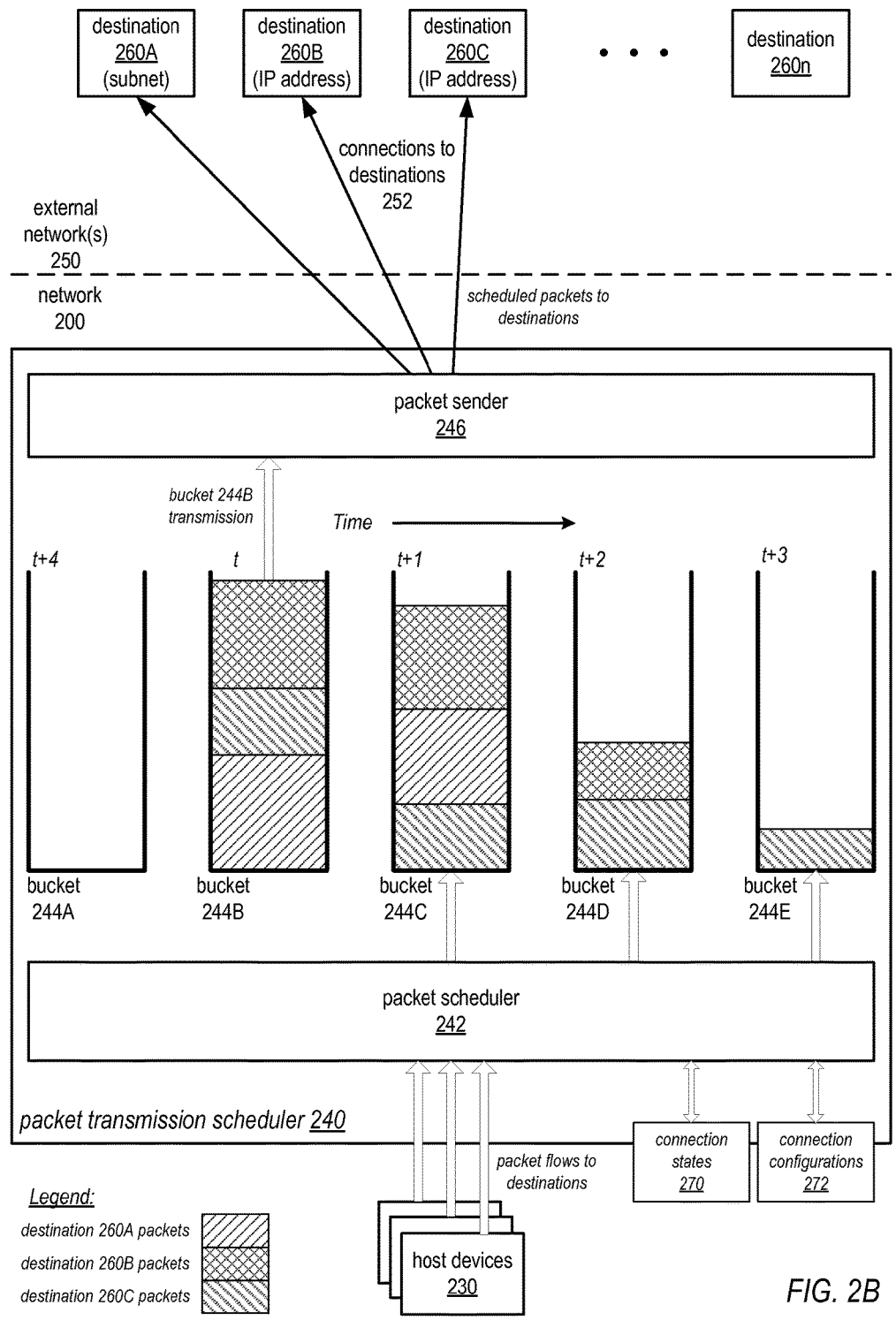
Figure 4:
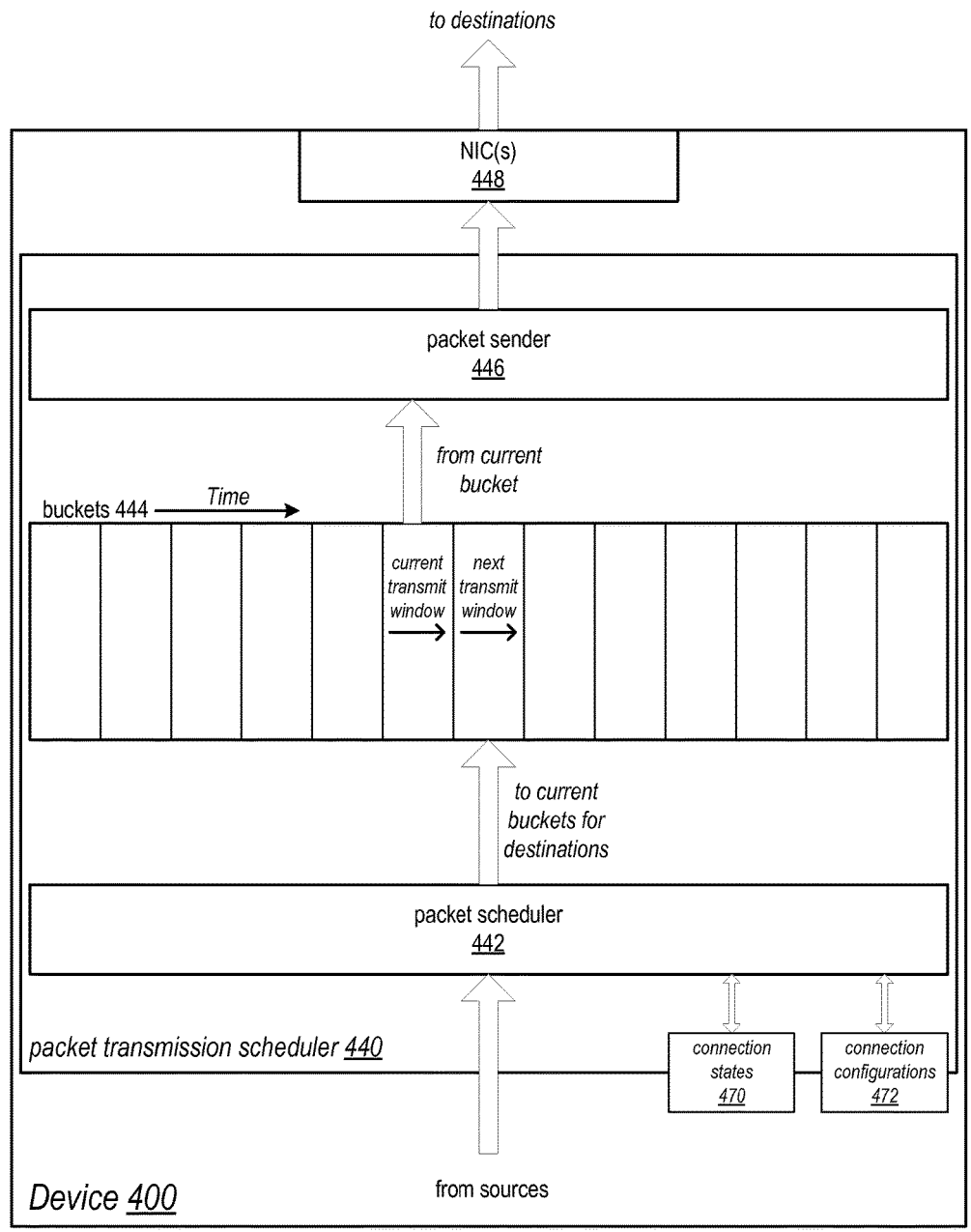
FIG. 4 illustrates a packet transmission scheduler implemented in a device, according to at least some embodiments.
Figure 7:
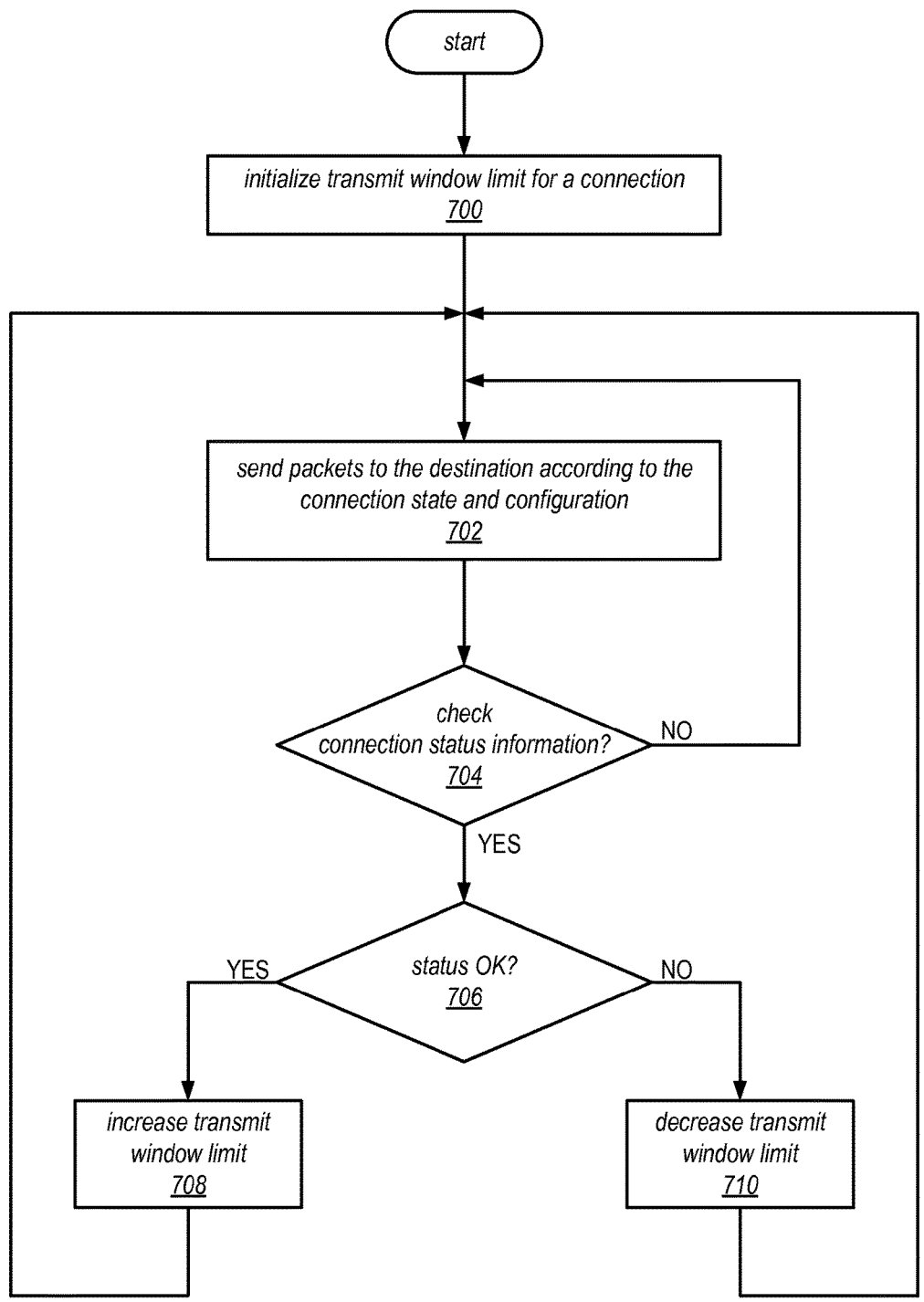
FIG. 7 is a high-level flowchart of a method for adjusting a transmit window limit for a particular connection, according to at least some embodiments.
Figure 8:
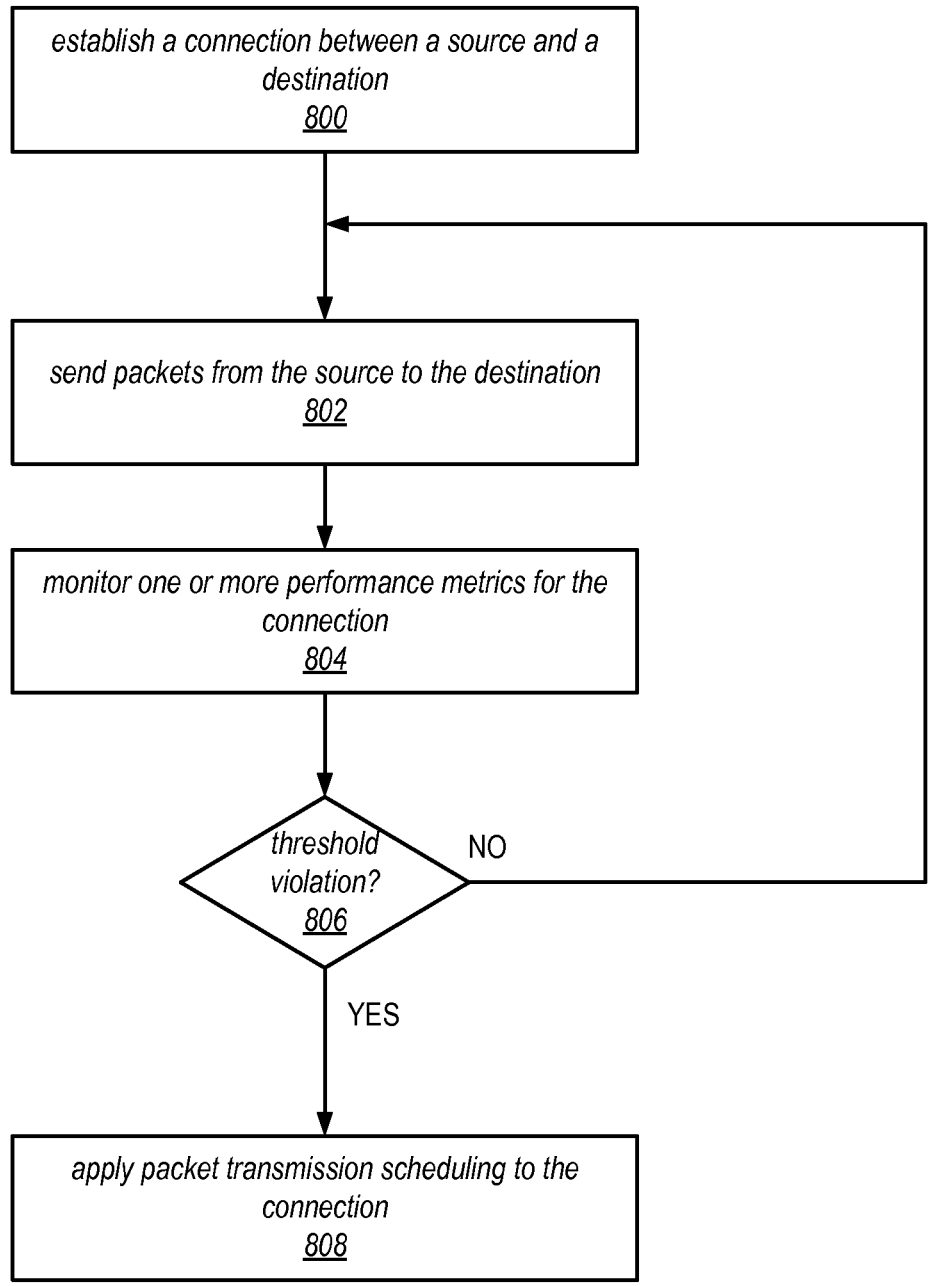
FIG. 8 is a high-level flowchart of a method for applying packet transmission scheduling to particular connections, according to at least some embodiments.
Figure 9:
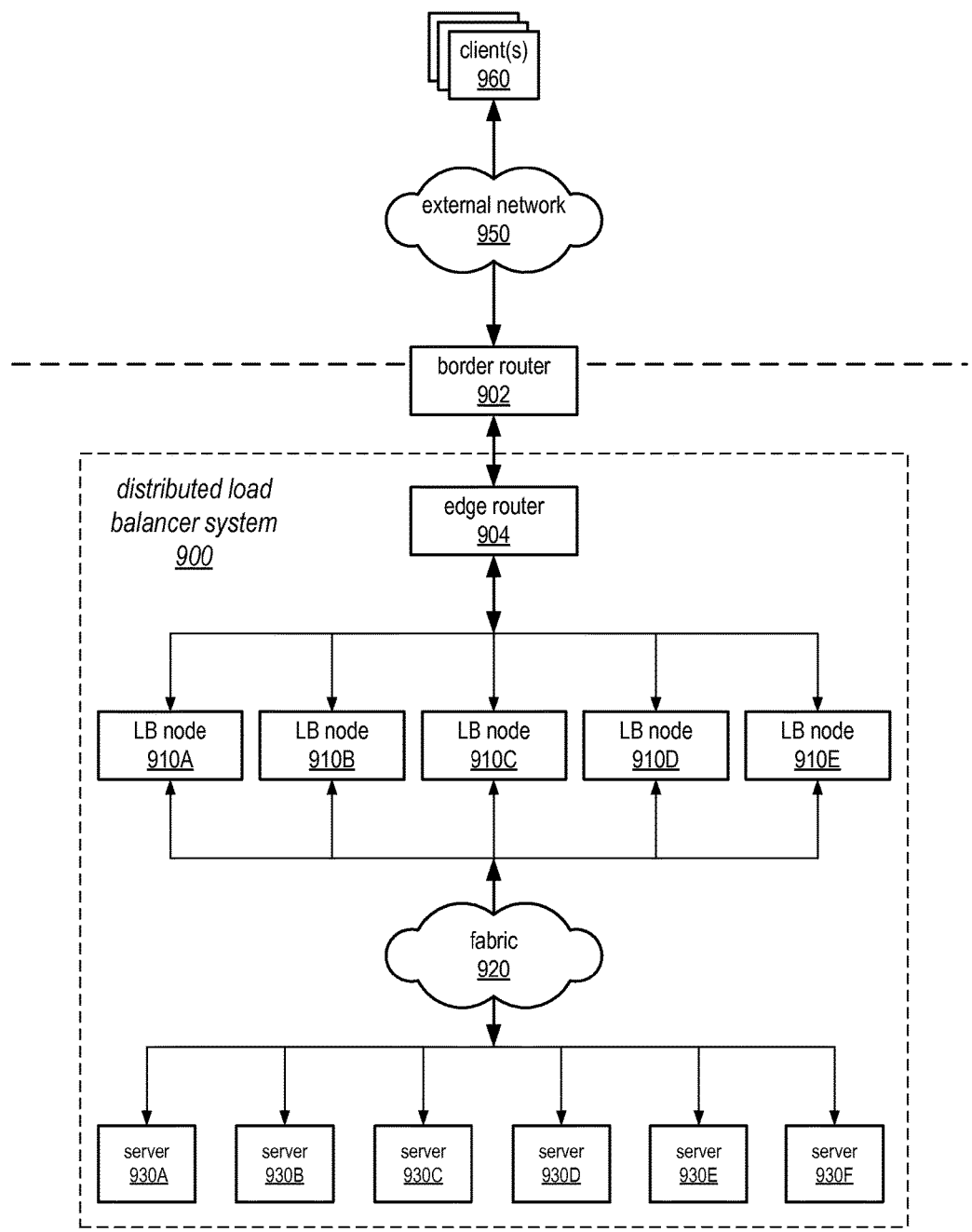
FIG. 9 illustrates an example distributed load balancer system in which embodiments of a packet transmission scheduler as illustrated in FIGS. 1 through 8 may be implemented.
Figure 10:
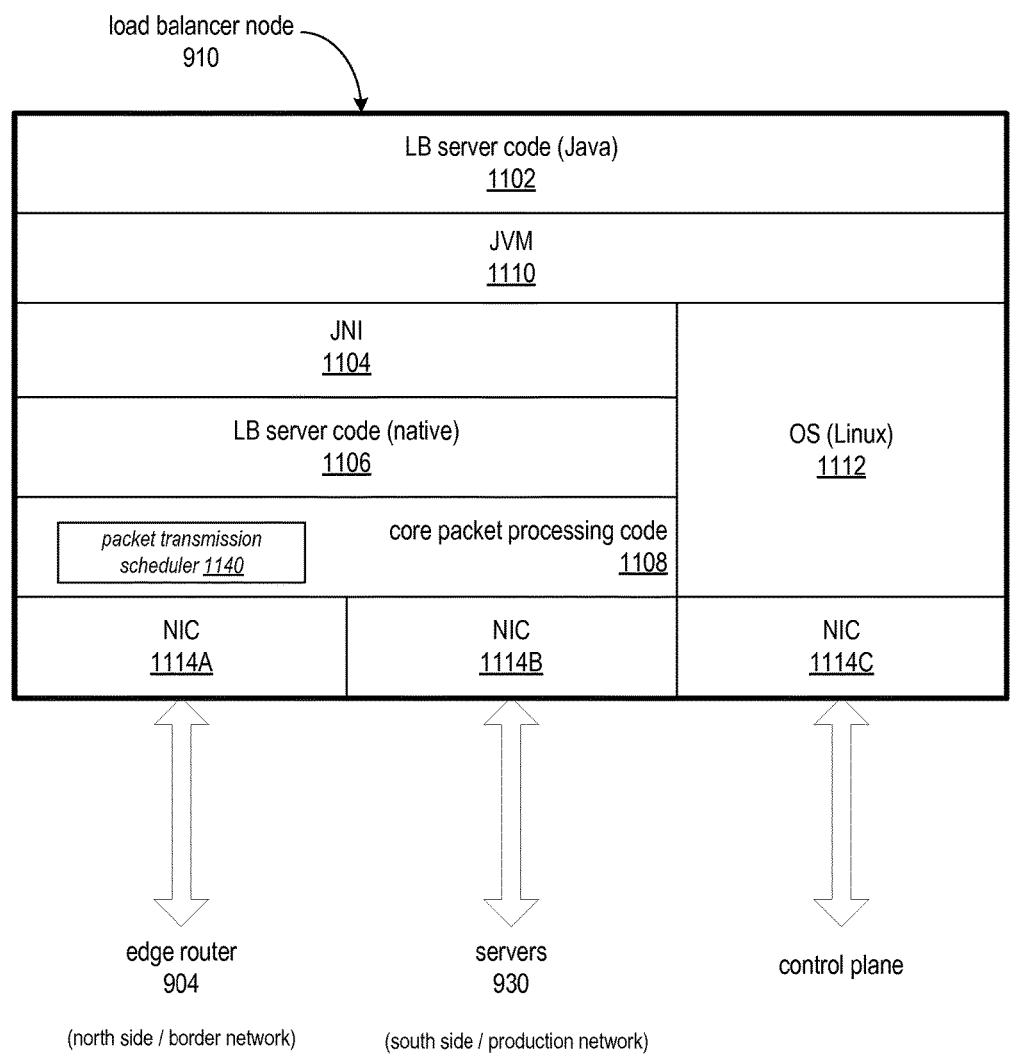
FIG. 10 illustrates an example software stack architecture for node that may implement a packet transmission scheduler, according to at least some embodiments.
Figure 11:
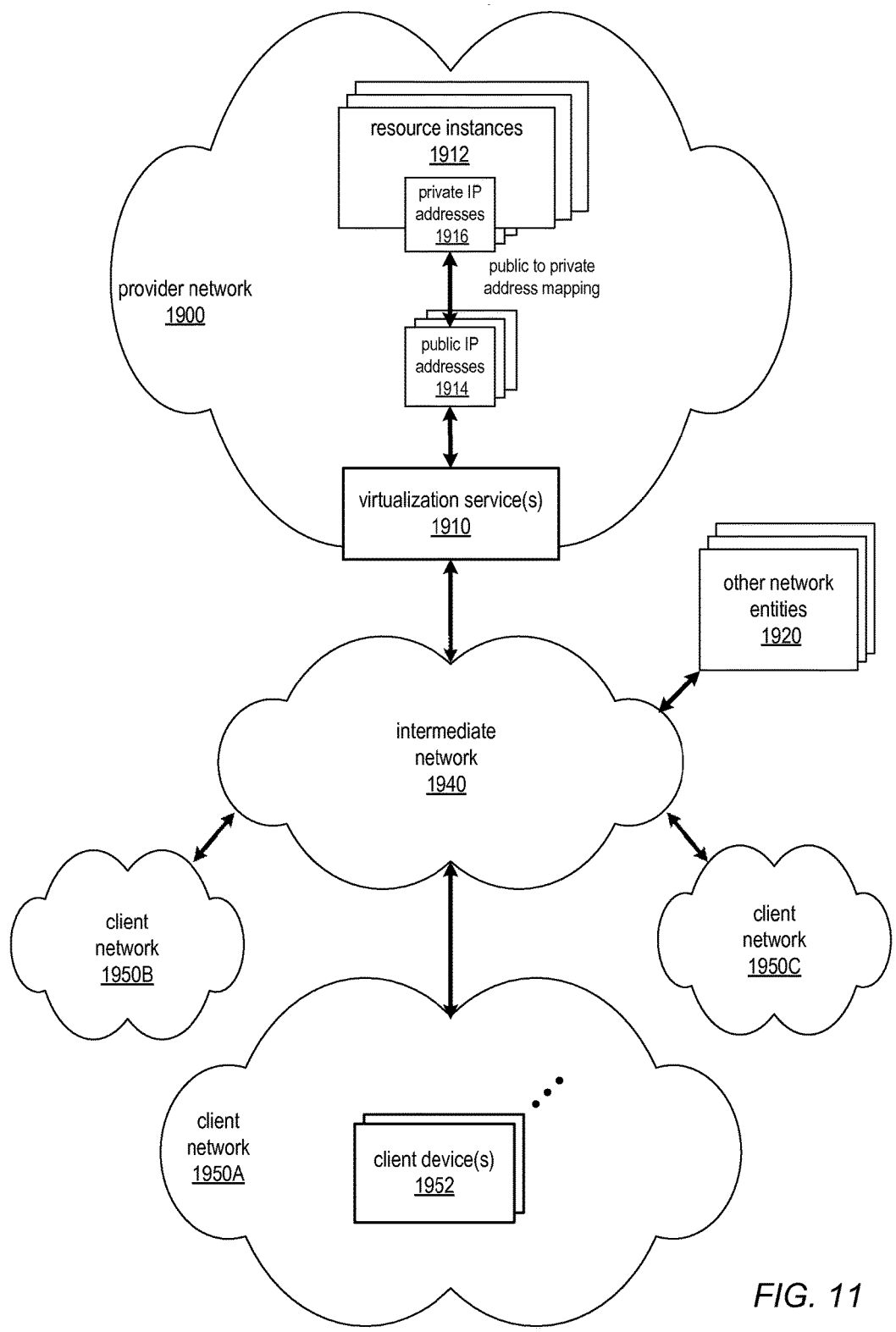
FIG. 11 illustrates an example provider network environment, according to at least some embodiments.

FIG. 1A illustrates a packet transmission scheduler 140 that implements packet transmission scheduling methods on a network 100, according to at least some embodiments. FIGS. 1B and 11 illustrate example network environments in which embodiments of a packet transmission scheduler as illustrated in FIG. 1A may be implemented. FIGS. 2A and 2B graphically illustrate packet transmission scheduling in an example network environment, according to an embodiment of a packet transmission scheduler as illustrated in FIG. 1A. FIG. 4 illustrates an example network device in which a packet transmission scheduler as illustrated in FIG. 1A may be implemented. FIGS. 5A through 8 illustrate embodiments of packet transmission scheduling methods that may be implemented in a packet transmission scheduler as illustrated in FIG. 1A. FIGS. 9 and 10 illustrate a non-limiting example use case in which a packet transmission scheduler may be implemented by load balancer nodes acting as egress servers in an example distributed load balancer system.

Referring to FIG. 1A, in some embodiments, a packet transmission scheduler 140 may receive packets from one or more packet sources on a network 100 targeted at one or more packet destinations on external network(s) 150, schedule the packets for transmission to the destinations according to transmit windows, and transmit the packets scheduled for a transmit window when the transmit window is reached. In some embodiments, packet transmission scheduler 140 may begin transmitting packets from a transmit window at a start time for the transmit window determined according to the transmit window length. For example, if the transmit window length is one millisecond (ms), transmit windows may be scheduled to begin at 1 ms intervals. However, in some embodiments, packet transmission scheduler 140 may not begin transmitting packets from a next transmit window until all of the packets in the current transmit window have been transmitted. In some embodiments, configuration information and state information for each connection 152 may be used in scheduling the packets for particular connections 152 into the transmit windows. In some embodiments, the configuration information for each connection may include a transmit window limit that specifies the maximum number of packets that can be scheduled in a transmit window for the connection. FIGS. 3A and 3B illustrate examples of state information for connections, according to some embodiments. FIG. 3B illustrates example configuration information for connections, according to some embodiments.

In some embodiments, each destination corresponding to a connection 152 may be a particular endpoint address on an external network 150, for example a particular Internet Protocol (IP) address on a particular destination host on the Internet. However, in some embodiments, a destination corresponding to a connection 152 may be a range of addresses, for example a subnetwork or subnet range as defined by a particular subnet mask.

In some embodiments, the device that implements the packet transmission scheduler 140, or some other factor or combination of factors, may determine a bandwidth limit for output of the packet transmission scheduler 140, for example 10 Gigabits per second (Gbps). The total amount of data that can be transmitted by the packet transmission scheduler 140 during a given time interval (referred to as the transmit window output maximum) is a function of its output bandwidth (e.g., 10 Gbps) and the length of the time interval. The time interval used for a transmit window may be implementation-specific. For example, transmit windows may be one millisecond (ms) in some implementations, but longer (e.g., 3 ms, 10 ms, 100 ms, 500 ms, 1 second, etc.) may be used in some implementations, or shorter transmit windows (e.g., 500 microseconds) may be used in some implementations.

In some embodiments, the packet transmission scheduler 140 may schedule packets for multiple connections 152, and may schedule packets for transmission to two or more connections 152 in each transmit window. The packet transmission scheduler 140 may limit the number of packets for each connection 152 scheduled in the transmit windows according to the transmit window limit for the respective connection. In some embodiments, the transmit window limit for a connection 152 may be determined from one or more known factors of the connection 152 (e.g., the bandwidth limit of a router on the connection 152). In some embodiments, the transmit window limit for a connection 152 may be dynamically determined or adjusted by the packet transmission scheduler 140 based on one or more monitored performance metrics for the connection.

In some embodiments, the packet transmission scheduler 140 may oversubscribe the transmit windows. As noted above, the packet transmission scheduler 140 may schedule packets for transmission to multiple connections 152, with the maximum number of packets in each transmit window for a given connection determined according to its transmit window limit. However, there is a transmit window output maximum for the packet transmission scheduler 140. In some cases, the total amount of data that can be scheduled for transmission by the packet transmission scheduler 140 to the multiple destinations in a given transmit window may be higher than the transmit window output maximum for the packet transmission scheduler 140. Alternatively, in some embodiments, the packet transmission scheduler 140 may not oversubscribe the transmit windows.

Referring to FIG. 1A, in some embodiments, to schedule packets for transmission in the transmit windows, the packet transmission scheduler 140 may place the packets to be scheduled in buckets 144 corresponding to respective transmit windows. In some embodiments, packets from one or more sources may be placed in a given bucket 144, and packets for one or more destinations may be placed in a given bucket 144. The buckets 144 may, for example, be implemented in a memory on the device on which the packet transmission scheduler 140 is implemented. In some embodiments, each bucket 144 may be implemented as a linked list of packets scheduled for transmission to one or more destinations during a particular transmit window, and buckets 144 may thus be maintained as an array of linked lists corresponding to current or upcoming transmit windows. In some embodiments, packets may be appended to the buckets 144 in the order received, and packets for two or more destinations may be interleaved in a bucket 144. However, buckets 144 may be otherwise implemented in memory, and packets for destinations may be otherwise ordered in the buckets 144.

In some embodiments, the packet transmission scheduler 140 transmits packets for a current transmit window from a corresponding bucket 144B, and moves to a next bucket 144C to begin transmitting packets at the beginning of a next transmit window (which becomes the current transmit window). As noted above, in some embodiments, the packet transmission scheduler 140 may oversubscribe the transmit windows, and thus in some cases bucket 144B may contain more data than can be transmitted during the current transmit window. In some embodiments, if all of the packets in bucket 144B are not transmitted during the current transmit window (e.g., by the beginning of the next transmit window), then the packet transmission scheduler 140 may continue to transmit packets from the bucket 144B until the bucket 144B is emptied before moving on to transmit the packets from the next bucket 144C corresponding to the next transmit window.

In some embodiments, additional packets are not placed in the bucket 144B corresponding to the current transmit window once the scheduler 140 begins transmitting from the bucket 144B; instead, the packets are placed in buckets 144 corresponding to upcoming transmit windows. However, in some embodiments, the packet transmission scheduler 140 may place additional packets for one or more destinations in the bucket 144B corresponding to the current transmit window, with the maximum number of packets placed in the bucket 144B for transmission during the current transmit window to a given destination determined according to the destination's transmit window limit. This may allow newly received packets for a destination to be scheduled for transmission to the destination as soon as possible.

As noted above, in some embodiments, the packet transmission scheduler 140 may place additional packets for one or more destinations in the bucket 144B corresponding to the current transmit window, with the maximum number of packets placed in the bucket 144B for transmission during the current transmit window to a given destination determined according to the destination's transmit window limit. For example, if the transmit window limit for a destination is 100 packets, there are 20 packets already scheduled in the current transmit window for the destination, and 200 additional packets for the destination are received during the current transmit window, then 80 of the 200 packets may be placed into bucket 144B for transmission during the current transmit window, with the remaining 120 packets scheduled in upcoming transmit windows.

In some situations, placing packets for a destination in a current transmit window may result in flooding a respective connection to the destination. For example, if the transmit window limit for a destination is 100 packets, and 200 packets for the destination are received near the end of the current transmit window, transmitting the first 100 packets near the end of the current transmit window and the second 100 packets near the start of the next transmit window would result in 200 packets being sent on the connection during a time period that is shorter than the actual transmit window length. Thus, to help temporally distribute the packets for the destination across the transmit windows and help prevent flooding the respective connection with packets, in some embodiments the number of additional packets that may be placed in a bucket 144 for transmission to a given destination during the current transmit window may be determined as a function of the destination's transmit window limit and the amount of time left in the current transmit window. As a non-limiting example, if the transmit window limit for a destination is 100 packets, and half of the current transmit window has passed when 200 packets are received for the destination for scheduling into the transmit windows, then at most 50 (100*0.5) of the 200 packets may be placed into the bucket 144 for transmission during the current transmit window.

For example, in FIG. 1A, packets from the sources for the destinations that have been placed in bucket 144B are being transmitted in the current transmit window to one or more destinations on the external network 150 via connections 152. Additional packets from the sources for the destinations are being placed in buckets 144C and 144D corresponding to upcoming transmit windows. If packets are received for a destination that has not reached its transmit window limit for bucket 144B, at least some of the packets may be placed into the bucket 144B for transmission during the current transmit window. In some embodiments, when the current transmit window is completed, the next transmit window becomes the current transmit window, and the packet transmission scheduler 140 may begin transmitting packets from the corresponding bucket (bucket 144C in this example). In some embodiments, packet transmission scheduler 140 may move from the current transmit window to the next transmit window at a start time for the next transmit window determined according to the transmit window length. For example, if the transmit window length is one millisecond (ms), transmit windows may be scheduled to begin at 1 ms intervals. However, in some embodiments, packet transmission scheduler 140 may not move to the next transmit window to begin transmitting packets scheduled for the next transmit window until all of the packets in the current transmit window have been transmitted. Thus, in some embodiments, the current transmit window is completed if the start time for a next transmit window is reached and if all of the packets in the bucket corresponding to the current transmit window have been transmitted.

In some embodiments, a transmit window limit may be maintained for each connection 152 to a destination that indicates how much data (e.g., how many packets) can be scheduled for the connection 152 in a transmit window. In some embodiments, the transmit window limit indicates a maximum number of packets that can be placed in each bucket 144 for the connection 152, and thus the maximum number of packets that are to be transmitted to the destination via the connection 152 in a given transmit window.

In some embodiments, connection states 170 for connections 152 are maintained by packet transmission scheduler 140 for use in scheduling the packets for the upcoming transmit windows. In some embodiments, the connection state information for a given connection 152 includes an indication of a bucket 144 corresponding to a transmit window into which packets for the connection 152 are currently being placed, and an indication of the number of packets for the connection 152 that have been placed into the respective bucket 144. In some embodiments, once the number of packets for the connection 152 that have been placed in the bucket 144 reaches the transmit window limit for the connection 152, the packet transmission scheduler 140 advances the state information for the connection 152 to the next transmit window and respective bucket 144 and places any subsequent packets for the respective connection 152 into the indicated bucket 144. Thus, a given connection 152 may have packets scheduled for transmission in one, two, or more transmit windows, with the number of packets to be transmitted to the given connection 152 in any one transmit window being at most the transmit window limit for the connection 152.

In some embodiments, the transmit window limit for a connection 152 may be determined or initialized according to known or discoverable information about the connection 152. For example, packet transmission scheduler 140 may know or may discover that a destination host for a given connection 152 includes a one Gigabit per second (Gbps) NIC; this bandwidth limit at the destination host may be used along with the transmit window length to calculate the transmit window limit for the respective connection 152. For example, if the transmit window length is one millisecond (ms), and a limiting factor of 1 Gbps is known for a connection 152, then the transmit window limit for the connection 152 may be 1 Megabit (1 Mbit) per transmit window. Assuming a packet size for the connection 152 of 10000 bits (1250 bytes) yields 100 1250-bit packets per transmit window for the connection 152. Note that this example is for illustrative purposes, and is not intended to be limiting.

As another example of determining or initializing the transmit window limit for a connection 152 according to known or discoverable information about the connection 152, in some embodiments address information of the connection 152 may be used to determine or initialize the transmit window limit for the connection 152 from other connections 152. For example, if the connection 152 is determined according to its IP address to be on a subnetwork with another connection 152 for which a transmit window limit has been determined, the connection 152's transmit window limit may be initialized to the transmit window limit of the other connection 152, as it is likely that the connections will have similar packet throughput and packet buffering capabilities.

In some embodiments, the transmit window limit for a connection 152 may be dynamically determined or adjusted by the packet transmission scheduler 140 based on one or more monitored performance metrics for the connection 152. For example, the transmit window limit for a connection 152 to a destination may initially be set to N packets per transmit window (e.g., 100 packets per transmit window). The packet transmission scheduler 140 may schedule and send packets to the destination over the connection 152 for some number of transmit windows, and may monitor performance metrics such as retransmits on the connection 152 (indicating dropped packets) and/or RTTs on the connection 152. If the monitored metrics are within performance threshold(s), the packet transmission scheduler 140 may increase the transmit window limit for the connection 152, for example to 110 packets per window. If the monitored metrics for the connection 152 remain within the performance threshold(s), then the packet transmission scheduler 140 may again increase the transmit window limit for the connection 152. If the monitored metrics for the connection 152 drop below the performance threshold(s) (e.g., if the connection 152 starts frequently dropping packets, or if RTT goes up significantly), then the packet transmission scheduler 140 may decrease the transmit window limit for the connection 152. Thus, over time the packet transmission scheduler 140 may determine optimal or near-optimal transmit window limits for one or more of the connections 152, where an optimal limit results in a maximum number of packets delivered over the connection 152 with a minimum number of dropped packets or other problems.

In some embodiments, while there is a transmit window limit for each connection 152, there may be no hard limit on the total number of packets from all connections 152 that can be scheduled for a given transmit window, and thus no hard limit on how many packets can be placed in a given bucket 144. However, the combined transmit window limits for all active connections 152 may be a limit on the number of packets in a given bucket 144. In some embodiments, however, a total packet limit for a transmit window may be specified to limit the total number of packets that can be scheduled for a given transmit window and thus limit the total number of packets that can be placed in a respective bucket 144. In these embodiments, if the total number of packets in a given window reaches the total limit for the window, the packet transmission scheduler 140 may begin placing packets in a next bucket 144 corresponding to a subsequent transmit window.

In some embodiments, some connections 152 between a source and a destination may not be scheduled connections 152 as shown in FIG. 1A. A connection 152 between a source and a destination for which packet transmission scheduling is not being applied may be referred to as an unscheduled connection. In some embodiments, packet transmission scheduling may only be applied to a connection 152 if one or more performance metrics for the connection 152 exceed performance thresholds for the metrics. For example, connections 152 from sources on network 100 to destinations on external network(s) 150 may be established as unscheduled connections, and a packet transmission scheduler 140, or another network process or device, may monitor dropped packets/retransmissions for the unscheduled connections 152. If the number of dropped packets for a particular connection 152 is above a threshold, then the packet transmission scheduler 140 may begin applying packet transmission scheduling to the connection 152. Similarly, RTT on the connection 152 may be monitored, and the packet transmission scheduler 140 may begin applying packet transmission scheduling to the connection 152 if the RTT exceeds a threshold.

In some embodiments, packet transmission scheduling may be applied to, or not applied to, a connection 152 based on known or discoverable information about the connection 152. For example, in some embodiments, when a connection 152 is being established between a source on network 100 and a destination on external network(s) 150, packet transmission scheduler 140 or another network process or device may determine that a destination host for the connection 152 includes a one Gigabit per second (Gbps) NIC, and thus packet transmission scheduling may be applied to the new connection 152. As another example, if a connection 152 is being established to a destination that is known to be reachable via reliable, high-speed network infrastructure, then packet transmission scheduling may not be applied to the new connection 152, at least initially.

FIG. 1B illustrates an example network environment in which embodiments of a packet transmission scheduler as illustrated in FIG. 1A may be implemented. Embodiments of a packet transmission scheduler 140 may, for example, be used to schedule packet transmissions on connections between packet sources such as servers (e.g., web servers, application servers, data servers, etc.) implemented on or as host devices 130 on a local network 100 such as a provider network 1900 as illustrated in FIG. 11, and packet destinations 160 such as client endpoint IP addresses or IP address ranges on an external network 150. The packets may, for example, be transmitted from the host devices 130 to the destinations 160 as packet flows, for example Transmission Control Protocol (TCP) technology packet flows over connections 152 between the host devices 130 and destinations 160. While embodiments are primarily described herein in relation to processing packets in TCP packet flows, note that embodiments may be applied to other data communications protocols than TCP, and to other data transmission applications than processing packet flows.

As a high-level overview of example connections 152 between destinations 160 (e.g., client endpoint IP addresses or IP address ranges) and sources (host devices 130) in an example network environment as illustrated in FIG. 1B, one or more client devices may connect to a border router 110 of the network 100, for example via an external network 150 such as the Internet. The border router 110 may route incoming packets (e.g., TCP packets) from the client devices to host devices 130 via a network fabric or substrate 102 that may include one or more networking devices or components including but not limited to switches, routers, load balancers, and cables. The host devices 130 may in turn route outgoing packets (e.g., TCP packets) for the client devices, for example as packet flows, to the border router 110 via the network substrate 102. The border router 110 may then send the outgoing packets onto the external network 150 to be routed to the appropriate destinations 160 (e.g., client endpoint IP addresses or IP address ranges) over respective connections 152.

In some embodiments, at least one instance of a packet transmission scheduler 140 may be implemented on at least one device on network 100 to provide packet transmission scheduling for connections 152 to destinations 160 over external network 150 as described above in reference to FIG. 1A. FIG. 4 illustrates a packet transmission scheduler implemented in an example device, according to at least some embodiments. In some embodiments, a packet transmission scheduler 140 may be implemented on at least one host device 130 on network 100 to schedule packet transmissions over one or more connections 152 to one or more destinations 160 from one or more sources (e.g. servers) implemented on the host device(s) 130. In some embodiments, at least one instance of a packet transmission scheduler 140 may be implemented on at least one device on the network substrate 102. For example, in some embodiments, packet transmission schedulers 140 may be implemented on one or more routers on substrate 102, or on one or more load balancer nodes that handle outgoing packet flows from network 100 to destinations on external network(s) 150.

FIGS. 2A and 2B graphically illustrate packet transmission scheduling in an example network environment, according to at least some embodiments. A packet transmission scheduler 240 may be implemented on a device in a network 200. The packet transmission scheduler 240 may, for example, be used to schedule packet transmissions from packet sources such as servers (e.g., web servers, application servers, data servers, etc.) implemented on or as host devices 230 on network 200, to packet destinations 260 such as client endpoint IP addresses (destinations 260B and 260C) or IP address ranges or subnets (e.g., destination 260A) on an external network 250 such as the Internet, via connections 252 over the external network. In some embodiments, the packet transmission scheduler 240 may include a packet scheduler 242 module, multiple buckets 244 for scheduling packets, and a packet sender 246 module. In this example, there are five buckets 244A-244E; however, there may be more or fewer buckets in various embodiments. Buckets 244 may, for example, be implemented in a memory on the device on which the packet transmission scheduler 240 is implemented. In some embodiments, each bucket 244 may be implemented as a linked list of packets scheduled for transmission during a particular transmit window, and buckets 244 may thus be maintained as an array of linked lists corresponding to the current and upcoming transmit windows. In some embodiments, packets may be appended to the buckets 244 in the order received. However, buckets 244 may be otherwise implemented in memory and/or ordered in the buckets 244.

In some embodiments, packet scheduler 242 may receive packets from host devices 230 on network 200 and schedule the packets for transmission to respective destinations during transmit windows. As an example, a transmit window may be one millisecond (ms) in duration. However, longer (e.g., 3 ms, 10 ms, 100 ms, 500 ms, 1 second, etc.) or shorter (e.g., 500 microseconds) transmit windows may be used in some embodiments. In some embodiments, each bucket 244 may correspond to a transmit window, with one bucket 244 corresponding to a current transmit window (shown at time t in FIGS. 2A and 2B) and the other buckets 244 corresponding to upcoming transmit windows (shown as times t+1-t+4 in FIGS. 2A and 2B).

In some embodiments, packet sender 246 transmits the packets from the bucket 244 corresponding to the current transmit window t to the destinations 260 via connections 252. When the start time for the next transmit window t+1 is reached, the next transmit window becomes the current transmit window, and the packet sender 246 advances to the bucket 244 corresponding to the now current transmit window to transmit the packets in that bucket 244 to respective destinations 260 via connections 252. Thus, as the packet sender 246 advances to transmit packets from the bucket 244 corresponding to the current transmit window, the transmit windows advance to correspond to next buckets 244. For example, in FIG. 2A, bucket 244A corresponds to transmit window t (the current transmit window), and packet sender 246 is currently transmitting the packets from bucket 244A to destinations 260A, 260B, and 260C. Bucket 244B corresponds to transmit window t+1 (the next transmit window), bucket 244C corresponds to transmit window t+2, and so on. Packet scheduler 242 is currently scheduling packets from host devices 230 into one or more upcoming transmit windows beginning at t+1 by placing the packets into buckets beginning at 244B.

In some embodiments, packet scheduler 242 may place additional packets for one or more destinations 260 into bucket 244A for transmission to respective destinations 260 during the current transmit window, with the maximum number of packets placed in the bucket 244A for transmission during the current transmit window to a given destination 260 determined according to the destination's transmit window limit. For example, if the transmit window limit for a destination 260A is 100 packets, there are 20 packets for the destination 260A already in bucket 244A and thus scheduled for transmission during the current transmit window, and 200 additional packets for destination 260A are received during the current transmit window, then 80 of the 200 packets may be placed into bucket 244A for transmission to destination 260A during the current transmit window, with the remaining 120 packets placed in buckets 244B and 244C for transmittal during upcoming transmit windows t+1 and t+2. In some embodiments, the number of additional packets that may be placed in a bucket 244 corresponding to the current transmit window for transmission to a given destination 260 during the current transmit window may be determined as a function of the destination 260's transmit window limit and the amount of time left in the current transmit window. As a non-limiting example, if the current transmit window is half over when additional packets for a destination 260 are received, then at most half of the transmit window limit for the destination 260 may be placed into the bucket 244.

In FIG. 2B, the current transmit window t has advanced to bucket 244B, transmit window t+1, the next transmit window, is now at bucket 244C, and so on, with bucket 244A, emptied during the previous transmit window, now corresponding to transmit window t+4. Packet sender 246 is currently transmitting the packets from bucket 244B to destinations 260A, 260B, and 260C. Packet scheduler 242 is currently scheduling packets from host devices into one or more upcoming transmit windows beginning at t+1 by placing the packets into buckets beginning at 244C. In some embodiments, packet scheduler 242 may place packets for one or more destinations 260 into bucket 244B for transmission to respective destinations 260 during the current transmit window.

In some embodiments, connection configurations 272 are maintained for connections 252 by packet transmission scheduler 240. In some embodiments, the configuration for each connection 252 may include a transmit window limit for the connection 252. FIG. 3C shows example connection configurations 272 for the connections 252 of FIGS. 2A and 2B, respectively. As shown in FIG. 3C, the transmit window limit for the connection 252 to destination 260A is 100 packets; the transmit window limit for the connection 252 to destination 260B is 80 packets; and the transmit window limit for the connection 252 to destination 260C is 50 packets.

In some embodiments, connection states 270 are maintained for connections 252 by packet scheduler 242 for use in scheduling the packets in the transmit windows. In some embodiments, the connection state information for a given connection 252 includes an indication of a bucket 244 corresponding to a transmit window into which packets for the connection 252 are currently being placed, and an indication of the number of packets for the connection 252 that have been placed into the respective bucket 244. In some embodiments, once the number of packets for the connection 252 that have been placed in the bucket reaches the transmit window limit for the connection 252, the packet scheduler 242 advances the state information for the connection 252 to the next bucket 244 and places any subsequent packets for the respective connection 252 into the bucket 244 now indicated in connection states 270. Thus, a given connection 252 may have packets scheduled for transmission in one, two, or more transmit windows, with the number of packets to be transmitted to the given connection 252 in any one transmit window being at most the transmit window limit for the connection 252.

FIGS. 3A and 3B show example connection states 270 for the connections 252 to destinations 260A-260C in FIGS. 2A and 2B, respectively. As shown in FIG. 3C, the transmit window limit for the connection 252 to destination 260A (a subnet, in this example) is 100 packets; the transmit window limit for the connection 252 to destination 260B (an IP address, in this example) is 80 packets; and the transmit window limit for the connection 252 to destination 260C (another IP address, in this example) is 50 packets. In FIG. 2A, bucket 244A corresponds to transmit window t (the current transmit window), and packet sender 246 is currently transmitting the packets from bucket 244A to destinations 260A, 260B, and 260C. Bucket 244B-244E correspond to upcoming transmit windows t+1-t+4. Packet scheduler 242 is scheduling packets from host devices 230 into the transmit windows t-t+4 for transmission to destinations 260A, 260B, and 260C.

As shown in FIG. 2A, destination 260A has already reached its transmit window limit (100 packets) for transmit window t+1 (bucket 244B). As shown in FIG. 3A, the connection state for the connection 252 to destination 260A indicates that packet scheduler 242 is currently placing packets for destination 260A into bucket 244C, which corresponds to transmit window t+2. Currently, there are 60 packets for destination 260A in bucket 244C. Since the transmit window limit for destination 260A is 100 packets, at most 40 more packets may be placed into bucket 244C for destination 260A.

As shown in FIG. 3A, the connection state for the connection 252 to destination 260B indicates that packet scheduler 242 is currently placing packets for destination 260B into bucket 244A, which corresponds to transmit window t (the current transmit window). Currently, there are 40 packets for destination 260B in bucket 244A. Since the transmit window limit for destination 260B is 80 packets, at most 40 more packets may be placed into bucket 244A for transmission to destination 260B during the current transmit window.

As shown in FIG. 2A, destination 260C has already reached its transmit window limit (50 packets) for transmit window t+1 (bucket 244B) and transmit window t+2 (bucket 244C). As shown in FIG. 3A, the connection state for the connection 252 to destination 260C indicates that packet scheduler 242 is currently placing packets for destination 260C into bucket 244D, which corresponds to transmit window t+3. Currently, there are 35 packets for destination 260C in bucket 244C. Since the transmit window limit for destination 260A is 50 packets, at most 15 more packets may be placed into bucket 244D for destination 260C.

In FIG. 2B, bucket 244B now corresponds to transmit window t (the current transmit window), and packet sender 246 is currently transmitting the packets from bucket 244B to destinations 260A, 260B, and 260C. Bucket 244C-244E and 240A now correspond to upcoming transmit windows t+1-t+4, respectively.

As shown in FIG. 3B, the connection state for the connection 252 to destination 260A indicates that packet scheduler 242 is currently placing packets for destination 260A into bucket 244C, which now corresponds to transmit window t+1. Currently, there are 80 packets for destination 260A in bucket 244C. Since the transmit window limit for destination 260A is 100 packets, at most 20 more packets may be placed into bucket 244C for destination 260A.

As shown in FIG. 2B, destination 260B has already reached its transmit window limit (80 packets) for transmit window t+1 (bucket 244C). As shown in FIG. 3B, the connection state for the connection 252 to destination 260B indicates that packet scheduler 242 is currently placing packets for destination 260B into bucket 244D, which corresponds to transmit window t+2. Currently, there are 40 packets for destination 260B in bucket 244C. Since the transmit window limit for destination 260B is 80 packets, at most 40 more packets may be placed into bucket 244C for destination 260B.

As shown in FIG. 2B, destination 260C has already reached its transmit window limit (50 packets) for transmit window t+1 (bucket 244C) and transmit window t+2 (bucket 244D). As shown in FIG. 3B, the connection state for the connection 252 to destination 260C indicates that packet scheduler 242 is currently placing packets for destination 260C into bucket 244E, which corresponds to transmit window t+3. Currently, there are 25 packets for destination 260C in bucket 244E. Since the transmit window limit for destination 260A is 50 packets, at most 25 more packets may be placed into bucket 244E for destination 260C.

FIG. 4 illustrates a packet transmission scheduler 440 implemented in a device 400 on a local network, according to at least some embodiments. Device 400 may, for example, be a host device on the local network, a router or other network device on a local network, or a load balancer node that handles outgoing packet flows from host devices on the local network to destinations on the external network. In some embodiments, the device 400 may include one or more network interface controllers (NICs) 448 that may interface to one or more networks for sending packets onto or receiving packets from the network(s). In some embodiments, the NICs 448 may include high-capacity NICs that are capable of 10 Gigabits per second (Gbps) or higher throughput.

The packet transmission scheduler 440 may, for example, be used to schedule packet transmissions from packet sources to packet destinations such as client endpoint addresses or ranges of addresses (e.g., subnets as defined by subnet masks) on an external network such as the Internet, via connections over the external network. The packet sources may be other devices on a network such as servers (e.g., web servers, application servers, data servers, etc.), or alternatively may be sources internal to or on the device 400, such as the operation system or application(s) on the device 400, or virtualized computation or storage resources on the device 400 as illustrated in FIG. 11.

In some embodiments, the packet transmission scheduler 440 may include a packet scheduler 442 module, multiple buckets 444 for scheduling packets, and a packet sender 446 module. Buckets 444 may, for example, be implemented in a memory on the device 400, for example as linked lists of packets. In some embodiments, packet scheduler 442 may receive packets from sources and schedule the packets for transmission by placing the packets in buckets 444 corresponding to transmit windows according to connection state 470 and connection configuration 472 information for respective destinations. In some embodiments, packet sender 446 transmits the packets from the bucket 444 corresponding to the current transmit window to the destinations, for example via a NIC 448. In some embodiments, packet scheduler 442 may place packets for the destinations into one or more upcoming transmit windows. In some embodiments, packet scheduler 442 may place at least some packets for one or more of the destinations into the bucket 444 corresponding to the current transmit window.

In some embodiments, connection configurations 472 are maintained by packet transmission scheduler 440. In some embodiments, the configuration for each connection to a destination may include a transmit window limit for the connection that specifies the maximum number of packets that can be placed into a transmit window for the respective destination. FIG. 3C shows example connection configurations, according to at least some embodiments. In some embodiments, connection states 470 are maintained for the connections by packet scheduler 442 for use in scheduling the packets into the transmit windows. In some embodiments, the connection state information for a given connection includes, but is not limited to, an indication of a bucket 444 corresponding to a transmit window into which packets for the connection are currently being placed, and an indication of the number of packets for the connection that have been placed into the respective bucket 444. FIGS. 3A and 3B show example connection states, according to at least some embodiments.

Example Packet Transmission Scheduling Methods

FIGS. 5A through 8 illustrate embodiments of packet transmission scheduling methods that may be implemented by a packet transmission scheduler as illustrated in FIGS. 1A through 4.

Figure 5A:
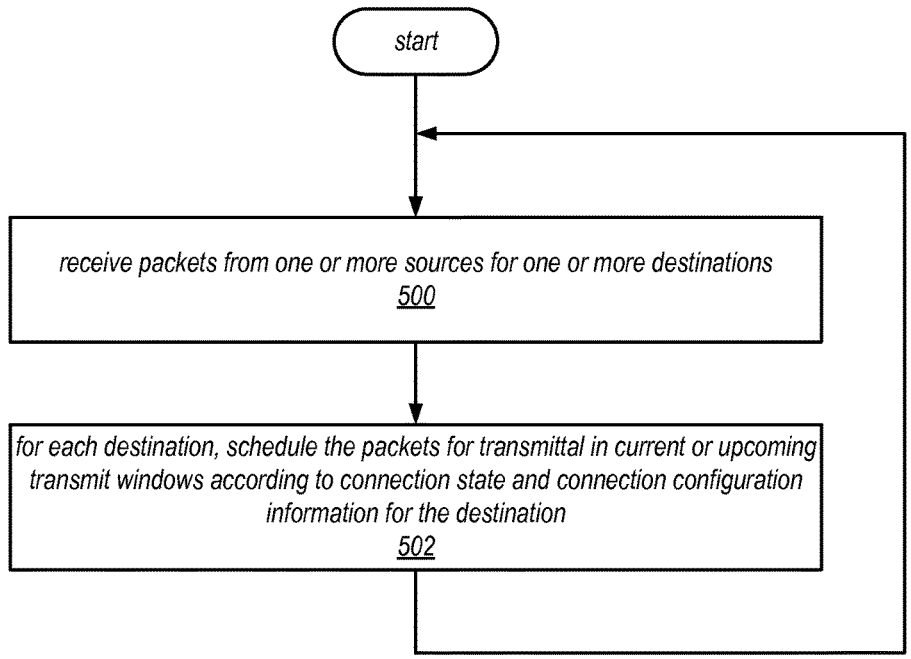
FIG. 5A is a high-level flowchart of a packet scheduler method, according to at least some embodiments.
Figure 5B:
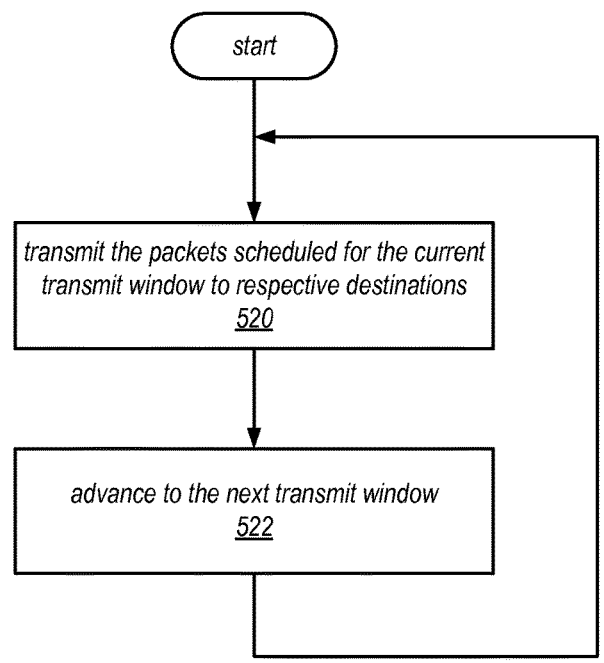
FIG. 5B is a high-level flowchart of a packet sender method, according to at least some embodiments.

FIGS. 5A and 5B illustrate packet scheduler and packet sender methods that may be implemented by a packet transmission scheduler, according to some embodiments. The packet scheduler method may be implemented by a packet scheduler component or module of a packet transmission scheduler to schedule packets for transmission in transmit windows. The packet sender method may be implemented by a packet sender component or module of a packet transmission scheduler and may run concurrently with the packet scheduler to transmit packets from a current transmit window. The current transmit window may be advanced at a defined time interval, for example every N milliseconds.

FIG. 5A is a high-level flowchart of a packet scheduler method that may be implemented by a packet scheduler component or module of a packet transmission scheduler on a network, according to at least some embodiments. As indicated at 500, the packet scheduler may receive packets from one or more sources on the network targeted at one or more destinations on an external network. In some embodiments, each destination may be a particular Internet Protocol (IP) address or a range of addresses such as a subnet. As indicated at 502, for each destination, the packet scheduler may schedule the respective packets for transmittal in current or upcoming transmit windows according to connection state and connection configuration information for the respective destination. In some embodiments, to schedule packets for transmission in the transmit windows, the packet transmission scheduler may place the packets to be scheduled in buckets corresponding to respective transmit windows. In some embodiments, the buckets may be implemented as linked lists of packets. As indicated by the arrow returning to 500, the packet scheduler may iteratively receive 500 and schedule 502 packets for transmittal to respective destinations during transmit windows. In some embodiments, when the start time for a next transmit window is reached, the transmit windows are advanced one bucket, so that a next upcoming transmit window becomes a current transmit window. In some embodiments, the transmit windows are not advanced until all of the packets in the current transmit window have been transmitted.

FIG. 5B is a high-level flowchart of a packet sender method that may be implemented by a packet sender component or module of a packet transmission scheduler on a network, according to at least some embodiments. As indicated at 520, the packet sender transmits the packets from a bucket corresponding to a current transmit window to respective destinations on the external network. As indicated at 522, when the current transmit window has been completed, the packet sender advances to the next transmit window, which becomes the current transmit window, to transmit the packets scheduled for that transmit window to respective destinations at 520. In some embodiments, a current transmit window is completed when the start time for a next transmit window is reached (or when the time interval of the current transmit window has finished). However, in some embodiments, the current transmit window is not advanced until all of the packets in the current transmit window have been transmitted. Thus, in some embodiments, the current transmit window is completed if the start time for a next transmit window is reached and if all of the packets in the bucket corresponding to the current transmit window have been transmitted.

Figure 6:
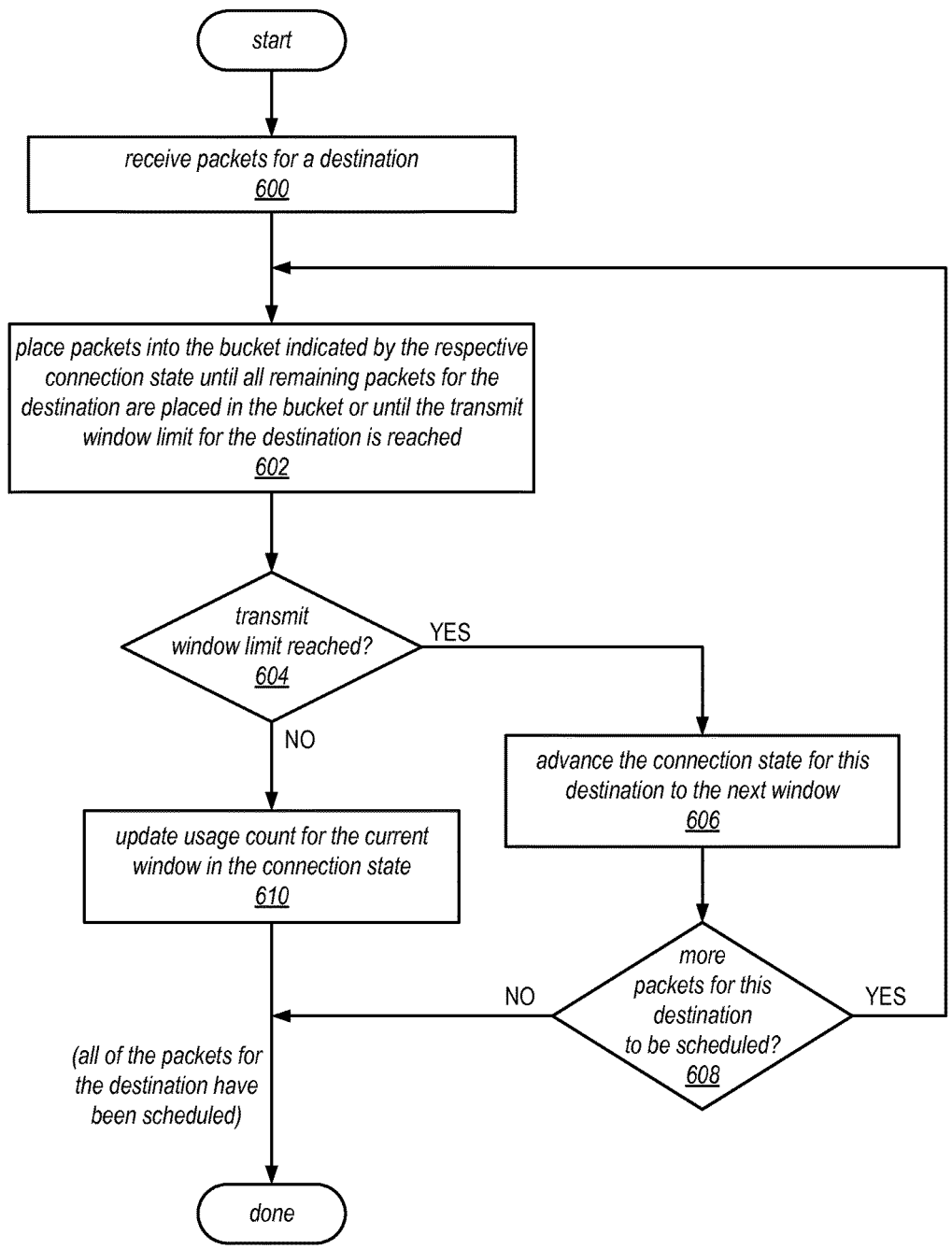
FIG. 6 is a high-level flowchart of a method for scheduling packets for a particular destination and connection, according to at least some embodiments.

FIG. 6 is a high-level flowchart of a method for scheduling packets for a particular destination and corresponding connection, according to at least some embodiments. As indicated at 600, a packet transmission scheduler may receive packets for a particular destination. As indicated at 602, the packet transmission scheduler may place at least some of the packets for the destination into a bucket indicated by the current connection state for the destination. In some embodiments, the packet transmission scheduler may place packets for the destination into the bucket until all remaining packets for the destination have been placed into the bucket or until the transmit window limit for the destination has been reached. At 604, if the transmit window limit for the destination was reached for this bucket, then at 606, the connection state for this destination is advanced to the next transmit window and its corresponding bucket, as indicated at 606. At 606, in some embodiments, the usage count in the connection state for this destination may be reset to zero (0). At 608, if there are more packets for the destination to be scheduled, then the method may return to 602 to place packets for the destination into the bucket now indicated by the connection state. Otherwise, at 608, the method is done. At 604, if the transmit window limit was not reached for this bucket when placing the packets in the bucket, then all of the packets for the destination have been scheduled. The usage count indicated in the connection state for this destination may be updated as indicated at 610, and the method is done.

For example, if 200 packets for a destination are received at element 600, and the packet window limit for the destination is 120 packets, then, at element 602, 120 packets may be placed into a current bucket. At element 604, the transmit window limit (120) for the connection has been reached, so the connection state is advanced to the next window at element 606, with the usage count in the connection state reset to 0. At element 608, there are 80 more packets for the destination to be scheduled, so the method returns to element 602, where the 80 packets are placed in the next bucket. At element 604, the transmit window limit has not been reached, but all of the packets for the destination have been scheduled; the usage count in the connection state for this destination may be updated to indicate 80 packets have been placed into the bucket for the currently indicated window, and the method is done.

In some embodiments, the transmit window limit for a connection may be dynamically determined or adjusted by the packet transmission scheduler based on one or more monitored performance metrics for the connection. FIG. 7 is a high-level flowchart of a method for adjusting a transmit window limit for a particular connection, according to at least some embodiments. As indicated at 700, a transmit window limit may be initialized for a connection to a destination. As indicated at 702, a packet transmission scheduler may schedule and send packets to the destination via the connection according to the current connection state and configuration, including the current transmit window limit. The packet transmission scheduler or another process on the network may monitor one or more performance metrics for the connections, for example dropped packets/retransmissions and/or round trip times (RTTs) may be monitored. As indicated at 704, the packet transmission scheduler may periodically or aperiodically check status of the connection. For example, the packet transmission scheduler may check to see if dropped packets and/or RTTs on the connection have exceeded a performance threshold. At 706, if the status is OK (e.g., if dropped packets and/or RTTs on the connection are within the performance threshold), then the packet transmission scheduler may increase the transmit window limit for the connection as indicated at 708, for example by 5 or 10%, and the method returns to 702. At 706, if the status is not OK (e.g., if dropped packets and/or RTTs on the connection are not within the performance threshold), then the packet transmission scheduler may decrease the transmit window limit for the connection as indicated at 710, for example by 5 or 10%, and the method returns to 702. In some embodiments, at 706, if the performance metrics for the connection are within a specified performance window, then the packet transmission scheduler may not change the transmit window limit.

In some embodiments, packet transmission scheduling may only be applied to a connection if one or more performance metrics for the connection exceed performance thresholds for the metrics. FIG. 8 is a high-level flowchart of a method for applying packet transmission scheduling to particular connections, according to at least some embodiments. As indicated at 800, a connection may be established between a source on a network and a destination on an external network. As indicated at 802, packets may be sent from the source to the destination. As indicated at 804, one or more performance metrics may be monitored for the connection. For example, a packet transmission scheduler, or another process or device on the network, may monitor dropped packets/retransmissions and/or RTTs for the connection. At 806, if the monitored performance metrics remain within performance thresholds, then the method returns to 802. Otherwise, at 806, if one or more of the monitored performance metrics for the connection violates a threshold (e.g., if dropped packets and/or RTTs on the connection are not within performance thresholds), then packet transmission scheduling may be applied to the connection, as indicated at 808.

Example Distributed Load Balancer System

FIG. 9 illustrates a distributed load balancer system 900, according to at least some embodiments. The distributed load balancer system 900 may include at least one edge router 904 and two or more load balancer (LB) nodes 910. The distributed load balancer system 900 may connect to clients 960 on an external network 950 via a border router 902 of a network installation such as a data center that implements the distributed load balancer system 900. The distributed load balancer system 900 may connect to server nodes 930 via a network fabric 920. In at least some embodiments, at least some components of the distributed load balancer system 900 may be implemented as or on separate computing devices, such as a commodity rack-mounted computing devices. As a high-level overview of packet handling in the distributed load balancer system 900, the border router 902 may route incoming packets (e.g., TCP packets) from clients 960 to an edge router 904 component of the distributed load balancer system 900 that routes the incoming packets to the load balancer (LB) nodes 910 in a load balancer node layer of the distributed load balancer system 900. The load balancer nodes 910 in turn distribute the packets to the server nodes 930 via a network fabric 920. The server nodes 930 may send packets for the clients 930 (e.g., TCP packets) to the LB nodes 910 via fabric 920; the LB nodes 910 send the packets on to the respective clients 960 via edge router 904, border router 902, and external network 950. In some embodiments, each load balancer node 910 may serve as an ingress server and/or as an egress server. As an ingress server, a LB node 910 performs the ingress role of receiving inbound packets from clients 960 and sending the packets to the servers 930. As an egress server, a LB node 910 performs the egress role of receiving outbound packets from the servers 930 and sending the packets on to the clients 960.

In some embodiments, one or more of the LB nodes 910 may implement an embodiment of the packet transmission scheduler as illustrated in FIGS. 1 through 8 to temporally smooth packet transmission from servers 930 to clients 960 over connections through external network 950 by scheduling the packets for transmission to the clients 960 in transmit windows, and by limiting the number of packets that can be scheduled for transmission to each client 960 in each transmit window. A transmit window limit and state information may be maintained for each connection and used in scheduling packets for the connections in the transmit windows. The packet transmission scheduler may dynamically adjust the transmit window limits for the connections according to performance feedback for the connections, allowing the packet transmission scheduler to determine optimal or near-optimal transmit window limits for connections so that packets can be sent to the clients 960 as quickly as possible at rates that the respective connections can handle without dropping packets or experiencing other problems such as long round trip times.

Example Node Architecture

FIG. 10 illustrates an example software stack architecture for a node or device that may implement a packet transmission scheduler according to at least some embodiments, and is not intended to be limiting. The software architecture may, for example, be used to implement a load balancer node 910 as illustrated in FIG. 9. In this example software stack architecture, the load balancer node 910 runs within a single Java™ technology process 1102 that uses Java Native Interface (JNI™) 1104 technology to manage a layer of native code that may include load balancer server native code 1106 and core packet processing code 1108, for example Intel™ Dataplane Development Kit (DPDK) technology code. DPDK technology permits a userspace program to read/write packets directly to and from a network interface controller (NIC), and bypasses many layers of the Linux kernel networking stack. The native code may interface to two network interface controllers (NICs 1114A and 1114B). A first NIC (NIC 1114A) may face "north"; that is, towards the edge router 904. A second NIC (NIC 1114B) may face "south"; that is, towards the server nodes 930.

In some embodiments, a packet transmission scheduler 1140 as illustrated in FIGS. 1 through 8 may be implemented in or at the core packet processing code 1108 layer of the software stack to schedule outgoing packets in transmit windows before the packets are passed to NIC 1114A. However, packet transmission scheduler 1140 may be implemented elsewhere in the software stack.

In at least some embodiment, NICs 1114A and 1114B may not maintain TCP stacks. Thus, at least some embodiments may include a third NIC 1114C that does support TCP connections so that the load balancer node 910 can communicate with processes via a control plane, and vice versa. Alternatively, in some embodiments, only the first, north-facing NIC 1114A and the second, south-facing NIC 111B may be implemented in the load balancer node 910, and the second, south-facing NIC 1114B may implement a TCP stack via which the load balancer node 910 may communicate with processes via the control plane.

In at least some embodiment, load balancer node 910 also includes operating system (OS) technology software 1112, e.g. a Linux™ kernel, and a Java Virtual Machine (JVM™) technology software 1110 layer on top of OS technology software 1112 and JNI 1104 technology.

Example Provider Network Environments

This section describes example provider network environments in which embodiments of the various methods and apparatus as described herein may be implemented. However, these example provider network environments are not intended to be limiting.

FIG. 11 illustrates an example provider network environment, according to at least some embodiments. A provider network 1900 may provide resource virtualization to clients via one or more virtualization services 1910 that allow clients to access, purchase, rent, or otherwise obtain instances 1912 of virtualized resources, including but not limited to computation and storage resources, implemented on host devices within the provider network or networks in one or more data centers. Private IP addresses 1916 may be associated with the resource instances 1912; the private IP addresses are the internal network addresses of the resource instances 1912 on the provider network 1900. In some embodiments, the provider network 1900 may also provide public IP addresses 1914 and/or public IP address ranges (e.g., Internet Protocol version 4 (IPv4) or Internet Protocol version 6 (IPv6) addresses) that clients may obtain from the provider 1900.

In some embodiments, the provider network 1900, via the virtualization services 1910, may allow a client of the service provider (e.g., a client that operates client network 1950A) to dynamically associate at least some public IP addresses 1914 assigned or allocated to the client with particular resource instances 1912 assigned to the client. The provider network 1900 may also allow the client to remap a public IP address 1914, previously mapped to one virtualized computing resource instance 1912 allocated to the client, to another virtualized computing resource instance 1912 that is also allocated to the client. Using the virtualized computing resource instances 1912 and public IP addresses 1914 provided by the service provider, a client of the service provider such as the operator of client network 1950A may, for example, implement client-specific applications and present the client's applications on an intermediate network 1940, such as the Internet. Other network entities 1920 on the intermediate network 1940 may then generate traffic to a destination public IP address 1914 published by the client network 1950A; the traffic is routed to the service provider data center, and at the data center is routed, via a network substrate, to the private IP address 1916 of the virtualized computing resource instance 1912 currently mapped to the destination public IP address 1914. Similarly, response traffic from the virtualized computing resource instance 1912 may be routed via the network substrate back onto the intermediate network 1940 to the source entity 1920.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In at least some embodiments, the mapping of a standard IP address to a private IP address of a resource instance is the default launch configuration for all a resource instance types.

At least some public IP addresses may be allocated to or obtained by clients of the provider network 1900; a client may then assign their allocated public IP addresses to particular resource instances allocated to the client. These public IP addresses may be referred to as client public IP addresses, or simply client IP addresses. Instead of being assigned by the provider network 1900 to resource instances as in the case of standard IP addresses, client IP addresses may be assigned to resource instances by the clients, for example via an API provided by the service provider. Unlike standard IP addresses, client IP addresses are allocated to client accounts and can be remapped to other resource instances by the respective clients as necessary or desired. A client IP address is associated with a client's account, not a particular resource instance, and the client controls that IP address until the client chooses to release it. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

Illustrative System

Figure 12:
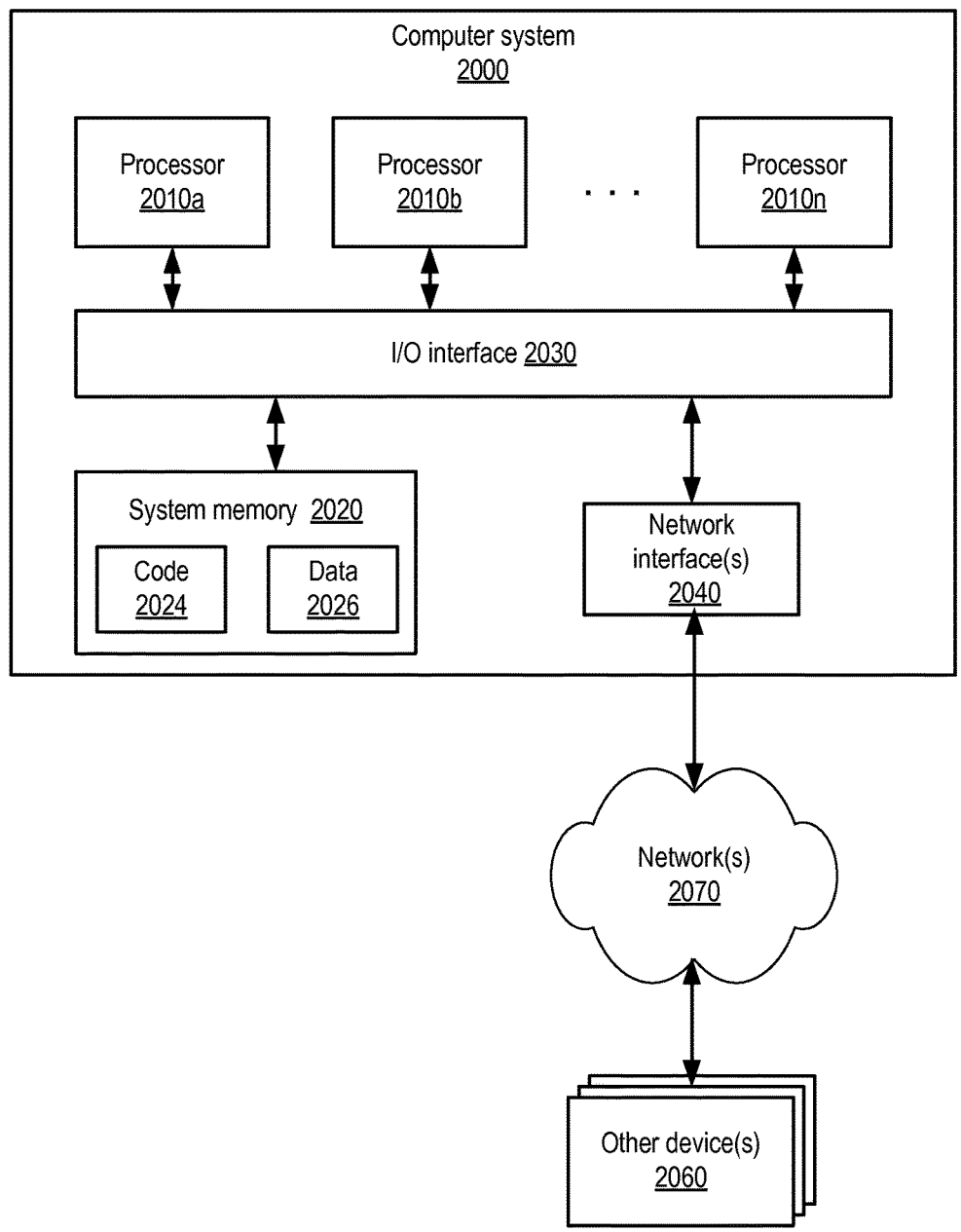
FIG. 12 is a block diagram illustrating an example computer system that may be used in some embodiments.

In at least some embodiments, a server that implements a portion or all of the methods and apparatus as described herein may include a general-purpose computer system that includes or is configured to access one or more computer-accessible media, such as computer system 2000 illustrated in FIG. 12. In the illustrated embodiment, computer system 2000 includes one or more processors 2010 coupled to a system memory 2020 via an input/output (I/O) interface 2030. Computer system 2000 further includes a network interface 2040 coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store instructions and data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for packet transmission scheduling methods and apparatus, are shown stored within system memory 2020 as code 2024 and data 2026.

In one embodiment, I/O interface 2030 may be configured to coordinate I/O traffic between processor 2010, system memory 2020, and any peripheral devices in the device, including network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices 2060 attached to a network or networks 2050, such as other computer systems or devices as illustrated in FIGS. 1 through 11, for example. In various embodiments, network interface 2040 may support communication via any suitable wired or wireless general data networks, such as types of Ethernet network, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium configured to store program instructions and data as described above for FIGS. 1 through 11 for implementing embodiments of a packet transmission scheduler. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2000 via I/O interface 2030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A device, comprising:
one or more processors; and
a memory comprising program instructions executable by at least one of the one or more processors to implement a packet transmission scheduler comprising:
a packet scheduler module configured to:
determine transmit window limits for connections over a network to a plurality of destinations, wherein a transmit window limit for a given connection indicates a maximum number of packets to send via the connection during a time interval;
monitor one or more performance metrics of the connections to the plurality of destinations;
adjust, in accordance with changes to the one or more performance metrics, a particular transmit window limit on network traffic for a particular destination of the plurality of destinations; and
for the particular destination of the plurality of destinations:
receive a plurality of packets for the particular destination from one or more sources, wherein the number of packets received for the particular destination is greater than the transmit window limit for the respective connection; and
distribute the plurality of packets for the particular destination into two or more buckets corresponding to two or more transmit windows, wherein the transmit windows are time intervals that begin at respective start times, and wherein, to distribute the packets for the particular destination, the number of packets placed into each bucket is less than or equal to the transmit window limit for the respective connection;
a packet sender module configured to:
during a current transmit window, send packets from a bucket corresponding to the current transmit window to respective destinations via respective connections, wherein a number of packets sent to a destination during the current transmit window is no greater than the transmit window limit for the respective connection;
determine that the start time for a next transmit window is reached and all of the packets in the bucket have been sent; and
advance the current transmit window to a next bucket in response to said determining.

2. The device as recited in claim 1, wherein the packet transmission scheduler is configured to maintain state information for each destination, wherein the state information for a given destination indicates a current bucket into which packets for the given destination are being placed and a count of packets for the given destination that have been placed into the current bucket.

3. The device as recited in claim 1, wherein, to distribute the packets for the particular destination into two or more buckets corresponding to two or more transmit windows, the packet scheduler module is configured to:
place packets for the particular destination into a current bucket for the particular destination until the transmit window limit for the particular destination is reached, wherein the current bucket for the particular destination corresponds to a first transmit window; and
advance the current bucket for the particular destination to a next bucket corresponding to a second transmit window.

4. The device as recited in claim 1, wherein, to distribute the packets for the particular destination into two or more buckets corresponding to two or more transmit windows, the packet scheduler module is configured to:
receive, during the current transmit window, the plurality of packets for the particular destination; and
place one or more of the plurality of packets into the bucket corresponding to the current transmit window for transmittal to the particular destination during the current transmit window, where at most the transmit window limit for the particular destination is placed into the bucket; and
place remaining packets for the particular destination into one or more upcoming transmit windows.

5. The device as recited in claim 1, wherein each bucket is a linked list of packets for one or more of the plurality of destinations, and wherein the packets in each bucket are transmitted to respective ones of the destinations during respective transmit windows.

6. The device as recited in claim 1, wherein, to adjust the particular transmit window limit on the network traffic for the particular destination of the plurality of destinations, the packet transmission scheduler is configured to:
increase or decrease the particular transmit window limit on the network traffic for the particular destination according to said changes to the one or more performance metrics.

7. The device as recited in claim 1, wherein the packet transmission scheduler is configured to:
determine that, for a monitored connection to a given destination of the plurality of destinations, at least one performance metric is below a performance threshold, wherein network traffic to the given destination on the monitored connection is not currently limited according to the transmit window limits; and
in response to said determining:
determine an initial transmit window limit for the monitored connection; and
begin placing packets for the given destination into the buckets corresponding to the transmit windows.

8. The device as recited in claim 1, wherein the plurality of destinations include one or more specific addresses on the network.

9. The device as recited in claim 1, wherein the plurality of destinations include ranges of addresses on the network.

10. The device as recited in claim 1, wherein the device is a load balancer node among a plurality of load balancer nodes in a distributed load balancer system receiving the plurality of packets, wherein respective load balancer nodes of the plurality of load balancer nodes comprise a respective one or more processors and a respective memory comprising program instructions executable by the least one of the one or more processors to implement the packet transmission scheduler, and wherein the sources are server nodes in the load balancer system.

11. A method, comprising:
determining, by a packet scheduler module implemented on one or more devices on a network, transmit window limits for connections over an external network to a plurality of destinations, wherein a transmit window limit for a given connection indicates a maximum number of packets to send via the connection during a transmit window;
obtaining, by the packet scheduler module, packets for the plurality of destinations from one or more sources;
distributing, by the packet scheduler module, the packets for the destinations into a plurality of buckets corresponding to a plurality of transmit windows, wherein the transmit windows are time intervals scheduled to begin at respective transmit window start times, wherein distributing the packets for the destinations into the plurality of buckets comprises limiting a number of packets placed into each bucket for each destination according to the transmit window limit for the respective connection;

transmitting, by a packet sender module implemented on the one or more devices, packets from a bucket corresponding to a current transmit window to respective destinations via connections over the external network;

advancing the current transmit window to a next bucket after completing the current transmit window, wherein the current transmit window is completed when the start time for a next transmit window is reached and all of the packets in the bucket corresponding to the current transmit window have been transmitted; and adjusting, in accordance with changes to performance metrics of a particular connection of the connections to a particular destination of the plurality of destinations, a particular transmit window limit on network traffic for the particular destination of the plurality of destinations.

12. The method as recited in claim 11, further comprising maintaining state information for each destination, wherein the state information for a given destination indicates a current bucket into which packets for the given destination are being placed and a count of packets for the given destination that have been placed into the current bucket.

13. The method as recited in claim 11, wherein said distributing the packets for the destinations into a plurality of buckets corresponding to a plurality of transmit windows comprises, for each destination:

placing packets for the destination into a current bucket for the destination until the transmit window limit for the destination is reached, wherein the current bucket for the destination corresponds to a first transmit window; and advancing the current bucket for the destination to a next bucket corresponding to a second transmit window.

14. The method as recited in claim 11, wherein said distributing the packets for the destinations into a plurality of buckets corresponding to a plurality of transmit windows comprises, for a given destination:

receiving, during the current transmit window, a plurality of packets for the destination; and placing one or more of the plurality of packets into the bucket corresponding to the current transmit window for transmittal to the destination during the current transmit window, where at most the transmit window limit for the destination is placed into the bucket; and placing remaining packets for the given destination into one or more upcoming transmit windows.

15. The method as recited in claim 11, wherein each bucket is a linked list of packets for one or more of the plurality of destinations, and wherein the packets in each bucket are transmitted to respective ones of the destinations during respective transmit windows.

16. The method as recited in claim 11, wherein said adjusting further comprises:

increasing or decreasing the particular transmit window limit for the particular destination of the plurality of destinations according to said changes to the performance metrics.

17. The method as recited in claim 11, further comprising:

determining that, for a monitored connection to a given destination of the one or more destinations, at least one performance metric of the performance metrics is below a performance threshold, wherein network traffic to the given destination on the monitored connection is not currently limited according to the transmit window limits; and in response to determining that the monitored connection is performing below the performance threshold, begin scheduling packets for transmittal to the given destination during the transmit windows.

18. A non-transitory computer-readable storage medium storing program instructions that when executed on one or more computers cause the one or more computers to implement a packet transmission scheduler on a network configured to:

determine transmit window limits for connections over an external network to a plurality of destinations, wherein a transmit window limit for a given connection indicates a maximum number of packets to send via the connection during a time interval;

schedule packets for transmittal to the plurality of destinations during two or more transmit windows according to state information for a plurality of connections to the plurality of destinations, wherein the state information for a given connection indicates a transmit window into which packets for the respective destination are currently being scheduled and a packet count for the respective destination that indicates how many packets for the destination have been scheduled in the indicated transmit window;

determine that the packet count for a given destination has reached a packet window limit for the respective connection; and in response to said determining, advance the transmit window for the given destination indicated in the state information to a next transmit window.

19. The non-transitory computer-readable storage medium as recited in claim 18, wherein the packet transmission scheduler is further configured to:

send packets scheduled for transmittal during a current transmit window to respective destinations via respective connections over the external network; and advance to a next transmit window upon completing sending of the packets from the current transmit window.

20. The non-transitory computer-readable storage medium as recited in claim 18, wherein the packet transmission scheduler is further configured to:

initialize the transmit window limits for the connections according to one or more characteristics of the connections or of the respective destinations; and monitor one or more performance metrics for each of one or more of the connections; and modify the transmit window limit for at least one connection according to the monitored performance metrics for the at least one connection.

* * * * *